US011620904B2

(12) United States Patent
Sugano

(10) Patent No.: US 11,620,904 B2
(45) Date of Patent: Apr. 4, 2023

(54) VEHICLE CONTROL METHOD, VEHICLE CONTROL SYSTEM, AND INFORMATION PROCESSING DEVICE

(71) Applicant: TOYOTA JIDOSHA KABUSHIKI KAISHA, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/568,900

(22) Filed: Jan. 5, 2022

(65) Prior Publication Data
US 2022/0284813 A1 Sep. 8, 2022

(30) Foreign Application Priority Data

Mar. 3, 2021 (JP) .............................. JP2021-033878

(51) Int. Cl.
*B60W 30/06* (2006.01)
*G08G 1/056* (2006.01)
*G08G 1/14* (2006.01)
*G08G 1/16* (2006.01)

(52) U.S. Cl.
CPC ............. *G08G 1/148* (2013.01); *B60W 30/06* (2013.01); *G08G 1/056* (2013.01); *G08G 1/146* (2013.01); *G08G 1/166* (2013.01)

(58) Field of Classification Search
None
See application file for complete search history.

(56) References Cited

U.S. PATENT DOCUMENTS

| 10,759,419 B2 | 9/2020 | Kindo et al. |
| 10,768,307 B2 | 9/2020 | Abari |
| 10,843,688 B2 | 11/2020 | Taki et al. |
| 10,864,909 B2 | 12/2020 | Taki et al. |
| 11,001,263 B2 | 5/2021 | Shimizu et al. |
| 11,008,018 B1 | 5/2021 | McGill et al. |
| 11,027,722 B2 | 6/2021 | Mizuno et al. |
| 11,030,863 B2 | 6/2021 | Kurtovic et al. |
| 11,041,957 B2 | 6/2021 | Uehara |

(Continued)

FOREIGN PATENT DOCUMENTS

| DE | 102017204162 A1 | 9/2018 |
| JP | 2011-235816 A | 11/2011 |

(Continued)

*Primary Examiner* — John F Mortell
(74) *Attorney, Agent, or Firm* — Dinsmore & Shohl LLP

(57) ABSTRACT

A vehicle control method for controlling vehicles adapted to automated valet parking in a parking lot includes acquiring map information of the parking lot and vehicle information indicating positions of the vehicles in the parking lot, determining whether a retreating vehicle is present based on the map information and the vehicle information, determining a retreating route through a retreating route determination process, and moving the retreating vehicle along the retreating route. The retreating route determination process includes acquiring traveling route information indicating an exiting route, searching for a non-interfering route that does not interfere with the exiting route based on the map information, the vehicle information, and the traveling route information, and determining the non-interfering route as the retreating route.

14 Claims, 25 Drawing Sheets

(56) References Cited

U.S. PATENT DOCUMENTS

| | | | |
|---|---|---|---|
| 11,214,254 B2 | 1/2022 | Vanterpool et al. | |
| 11,214,274 B2 | 1/2022 | Hansel et al. | |
| 11,235,766 B2 | 2/2022 | Masui et al. | |
| 11,256,986 B2 | 2/2022 | Tang et al. | |
| 11,267,460 B2 | 3/2022 | Sugano | |
| 11,279,372 B2 | 3/2022 | Bobier-Tiu et al. | |
| 11,292,489 B2 | 4/2022 | Liu et al. | |
| 11,314,252 B2 | 4/2022 | Kuffner, Jr. | |
| 11,314,253 B2 | 4/2022 | Kuffner, Jr. | |
| 11,318,943 B2 | 5/2022 | Yokota | |
| 11,325,603 B2 | 5/2022 | McGill et al. | |
| 11,341,866 B2 | 5/2022 | Urano et al. | |
| 11,370,437 B2 | 6/2022 | Sakai et al. | |
| 11,377,149 B2 | 7/2022 | Sato et al. | |
| 11,407,432 B2 | 8/2022 | Keshavamurthy et al. | |
| 11,410,356 B2 | 8/2022 | Molinari | |
| 11,410,434 B2 * | 8/2022 | Onishi | G06V 20/586 |
| 11,418,597 B2 | 8/2022 | Higuchi et al. | |
| 11,433,924 B2 | 9/2022 | Kataoka et al. | |
| 11,440,566 B2 | 9/2022 | Kawanai | |
| 11,447,129 B2 | 9/2022 | Mangalam et al. | |
| 11,449,053 B2 | 9/2022 | Hashimoto | |
| 2018/0261092 A1 * | 9/2018 | Tsuyunashi | G08G 1/146 |
| 2020/0070890 A1 | 3/2020 | Hattori | |
| 2020/0125120 A1 * | 4/2020 | Harvey | G05D 1/0022 |
| 2020/0290601 A1 | 9/2020 | Yamanaka et al. | |
| 2020/0294401 A1 * | 9/2020 | Kerecsen | G05D 1/0287 |
| 2021/0114617 A1 * | 4/2021 | Phillips | B60W 30/0956 |
| 2021/0114620 A1 * | 4/2021 | Yu | B60W 60/0025 |
| 2021/0148726 A1 * | 5/2021 | Ostafew | G05D 1/0044 |
| 2022/0176995 A1 * | 6/2022 | Subramanian | G05D 1/0214 |
| 2022/0204043 A1 * | 6/2022 | Xu | G06N 20/00 |

FOREIGN PATENT DOCUMENTS

| | | |
|---|---|---|
| JP | 2018-188027 A | 11/2018 |
| JP | 2020-149537 A | 9/2020 |

* cited by examiner

VEHICLE CONTROL METHOD, VEHICLE CONTROL SYSTEM, AND INFORMATION PROCESSING DEVICE

CROSS-REFERENCE TO RELATED APPLICATION

This application claims priority to Japanese Patent Application No. 2021-033878 filed on Mar. 3, 2021, incorporated herein by reference in its entirety.

BACKGROUND

1. Technical Field

The present disclosure relates to a vehicle control method, a vehicle control system, and an information processing device for controlling a vehicle adapted to automated valet parking (AVP) in a parking lot.

2. Description of Related Art

Japanese Unexamined Patent Application Publication No. 2020-149537 (JP 2020-149537 A) discloses a technology related to automated valet parking. A parking lot management device has a function of guiding a vehicle in a parking lot. A vehicle control device communicates with the parking lot management device. The vehicle control device performs driving control including at least one of speed control and steering control based on information received from the parking lot management device. The vehicle control device determines whether an abnormality has occurred in the parking lot management device. When determination is made that an abnormality has occurred in the parking lot management device, the vehicle control device limits the driving control guided by the parking lot management device.

Japanese Unexamined Patent Application Publication No. 2018-188027 (JP 2018-188027 A) discloses an automated valet parking vehicle that voluntarily searches for an available parking slot. When the available parking slot cannot be found, the automated valet parking vehicle notifies a user terminal about the fact, and follows an instruction from a user.

Japanese Unexamined Patent Application Publication No. 2011-235816 (JP 2011-235816 A) discloses a parking assistance device that assists automated parking of a vehicle by remote control. With this parking assistance device, the vehicle can be parked even in a garage having no sufficient space to open and close a door for a driver to get into and out of the vehicle. When the vehicle is expected to have difficulty in driving by itself after parking due to malfunction or the like, the parking assistance device prohibits the automated parking assistance.

SUMMARY

Automated valet parking in a parking lot is known. A vehicle adapted to the automated valet parking travels autonomously at least in the parking lot. In the automated valet parking, drivers do not get into and out of vehicles after parking. Therefore, many vehicles can be parked at close intervals at front, back, right, and left ("packed parking"). Such a parking method is useful from the viewpoint of efficient use of parking spaces.

However, any other vehicle may be parked in a parking slot that is in front of an exiting vehicle scheduled to exit the parking lot. That is, a parked vehicle may hinder movement of the exiting vehicle. In that case, it is necessary to first move (retreat) the parked vehicle that is hindering the movement of the exiting vehicle before starting the movement of the exiting vehicle. However, the movement (retreat) of the parked vehicle may disturb or stagnate a traffic flow in the parking lot. This causes a decrease in processing efficiency associated with the automated valet parking.

The present disclosure provides a vehicle control method, a vehicle control system, and an information processing device capable of suppressing influence of vehicle movement along with exit of an exiting vehicle on a traffic flow in a parking lot in relation to automated valet parking in the parking lot.

A first aspect of the present disclosure relates to a vehicle control method for controlling vehicles adapted to automated valet parking in a parking lot. The vehicle control method includes acquiring map information of the parking lot and vehicle information indicating positions of the vehicles in the parking lot, determining whether a retreating vehicle is present based on the map information and the vehicle information, determining a retreating route through a retreating route determination process, and moving the retreating vehicle along the retreating route. The retreating vehicle is a vehicle that needs to move from a parking slot where the retreating vehicle is parked to move an exiting vehicle scheduled to exit the parking lot. The retreating route is a traveling route of the retreating vehicle when the retreating vehicle is moved to move the exiting vehicle. The retreating route determination process includes acquiring traveling route information indicating an exiting route that is a traveling route of the exiting vehicle, searching, through a non-interfering route search process, for a non-interfering route that does not interfere with the exiting route based on the map information, the vehicle information, and the traveling route information, and determining the non-interfering route as the retreating route.

In the vehicle control method according to the first aspect of the present disclosure, non-interference between the non-interfering route and the exiting route may include at least one of the following conditions: a traveling direction of the retreating vehicle and a traveling direction of the exiting vehicle coincide with each other at a position where the non-interfering route and the exiting route overlap each other, the non-interfering route and the exiting route do not intersect each other on a passageway except a vicinity of the parking slot where the retreating vehicle is parked, and the retreating vehicle moving along the non-interfering route and the exiting vehicle moving along the exiting route are separated by a predetermined distance or more at any time.

In the vehicle control method according to the first aspect of the present disclosure, the traveling route information may further indicate a peripheral vehicle route that is a traveling route of a peripheral vehicle traveling in the parking lot. The retreating route determination process may include searching for a first non-interfering route based on the map information, the vehicle information, and the traveling route information and determining the first non-interfering route as the retreating route when the first non-interfering route is found. The first non-interfering route may be the non-interfering route that interferes with neither the exiting route nor the peripheral vehicle route.

In the vehicle control method according to the first aspect of the present disclosure, non-interference between the non-interfering route and the peripheral vehicle route may include at least one of the following conditions: a traveling direction of the retreating vehicle and a traveling direction of the peripheral vehicle coincide with each other at a position where the non-interfering route and the peripheral vehicle route overlap each other, the non-interfering route and the peripheral vehicle route do not intersect each other, and the retreating vehicle moving along the non-interfering route and the peripheral vehicle moving along the peripheral vehicle route are separated by a predetermined distance or more at any time.

In the vehicle control method according to the first aspect of the present disclosure, the retreating route determination process may include determining a second non-interfering route as the retreating route when the first non-interfering route is not found. The second non-interfering may be the non-interfering route that does not interfere with the exiting route.

In the vehicle control method according to the first aspect of the present disclosure, the non-interfering route may be a circling route in which the retreating vehicle moves from an original parking slot and then returns to the original parking slot.

In the vehicle control method according to the first aspect of the present disclosure, the non-interfering route may be a relocation route in which the retreating vehicle moves from an original parking slot to another available parking slot.

In the vehicle control method according to the first aspect of the present disclosure, the non-interfering route search process may include searching for a circling route, setting the circling route as the non-interfering route when the circling route is found, searching, when the circling route is not found, for a relocation route based on parking status information indicating usage of each parking slot in the parking lot, and setting the relocation route as the non-interfering route when the relocation route is found. The circling route may be the non-interfering route in which the retreating vehicle moves from an original parking slot and then returns to the original parking slot. The relocation route may be the non-interfering route in which the retreating vehicle moves from the original parking slot to another available parking slot.

In the vehicle control method according to the first aspect of the present disclosure, the non-interfering route search process may include searching for a circling route, determining, when the circling route is found, whether a length of the circling route is less than a threshold, setting the circling route as the non-interfering route when the length of the circling route is less than the threshold, searching, when the circling route is not found or when the length of the circling route is equal to or more than the threshold, for a relocation route based on parking status information indicating usage of each parking slot in the parking lot, and setting the relocation route as the non-interfering route when the relocation route is found. The circling route may be the non-interfering route in which the retreating vehicle moves from an original parking slot and then returns to the original parking slot. The relocation route may be the non-interfering route in which the retreating vehicle moves from the original parking slot to another available parking slot.

In the vehicle control method according to the first aspect of the present disclosure, the non-interfering route search process may include searching for a circling route, determining, when the circling route is found, whether an expected return time is earlier than a scheduled exit start time of the retreating vehicle, setting the circling route as the non-interfering route when the expected return time is earlier than the scheduled exit start time, searching, when the circling route is not found or when the expected return time is later than the scheduled exit start time, for a relocation route based on parking status information indicating usage of each parking slot in the parking lot, and setting the relocation route as the non-interfering route when the relocation route is found. The circling route may be the non-interfering route in which the retreating vehicle moves from the original parking slot and then returns to the original parking slot. The expected return time may be a time when the retreating vehicle is expected to return to an original parking slot. The relocation route may be the non-interfering route in which the retreating vehicle moves from the original parking slot to another available parking slot.

In the vehicle control method according to the first aspect of the present disclosure, the non-interfering route search process may include searching for a relocation route based on parking status information indicating usage of each parking slot in the parking lot, setting the relocation route as the non-interfering route when the relocation route is found, searching for a circling route when the relocation route is not found, and setting the circling route as the non-interfering route when the circling route is found. The relocation route may be the non-interfering route in which the retreating vehicle moves from an original parking slot to another available parking slot. The circling route may be the non-interfering route in which the retreating vehicle moves from the original parking slot and then returns to the original parking slot.

The vehicle control method according to the first aspect of the present disclosure may include moving the exiting vehicle along the exiting route after starting movement of the retreating vehicle.

A second aspect of the present disclosure relates to a vehicle control system configured to control vehicles adapted to automated valet parking in a parking lot. The vehicle control system includes one or more storage devices configured to store map information of the parking lot and vehicle information indicating positions of the vehicles in the parking lot, and one or more processors. The processors are configured to determine whether a retreating vehicle is present based on the map information and the vehicle information, determine a retreating route through a retreating route determination process, and move the retreating vehicle along the retreating route. The retreating vehicle is a vehicle that needs to move from a parking slot where the retreating vehicle is parked to move an exiting vehicle scheduled to exit the parking lot. The retreating route is a traveling route of the retreating vehicle when the retreating vehicle is moved to move the exiting vehicle. The retreating route determination process includes acquiring traveling route information indicating an exiting route that is a traveling route of the exiting vehicle, searching for a non-interfering route that does not interfere with the exiting route based on the map information, the vehicle information, and the traveling route information, and determining the non-interfering route as the retreating route.

A third aspect of the present disclosure relates to an information processing device configured to control vehicles adapted to automated valet parking in a parking lot. The information processing device includes one or more storage devices configured to store map information of the parking lot and vehicle information indicating positions of the vehicles in the parking lot, and one or more processors. The processors are configured to determine whether a retreating vehicle is present based on the map information and the vehicle information, determine a retreating route through a retreating route determination process, and move the retreating vehicle along the retreating route. The retreating vehicle is a vehicle that needs to move from a parking slot where the retreating vehicle is parked to move an exiting vehicle scheduled to exit the parking lot. The retreating route is a traveling route of the retreating vehicle when the retreating vehicle is moved to move the exiting vehicle. The retreating route determination process includes acquiring traveling route information indicating an exiting route that is a traveling route of the exiting vehicle, searching for a non-interfering route that does not interfere with the exiting route based on the map information, the vehicle information, and the traveling route information, and determining the non-interfering route as the retreating route.

According to the present disclosure, when any retreating vehicle needs to move for the exit of the exiting vehicle, the retreating route of the retreating vehicle is determined. In the determination of the retreating route, at least the exiting route of the exiting vehicle is taken into consideration. The non-interfering route that does not interfere with at least the exiting route is determined as the retreating route of the retreating vehicle. As a result, it is possible to suppress influence of the movement of the retreating vehicle on a traffic flow in the parking lot. As a result, the decrease in processing efficiency associated with the automated valet parking is suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview of Automated Valet Parking System

Figure 1:
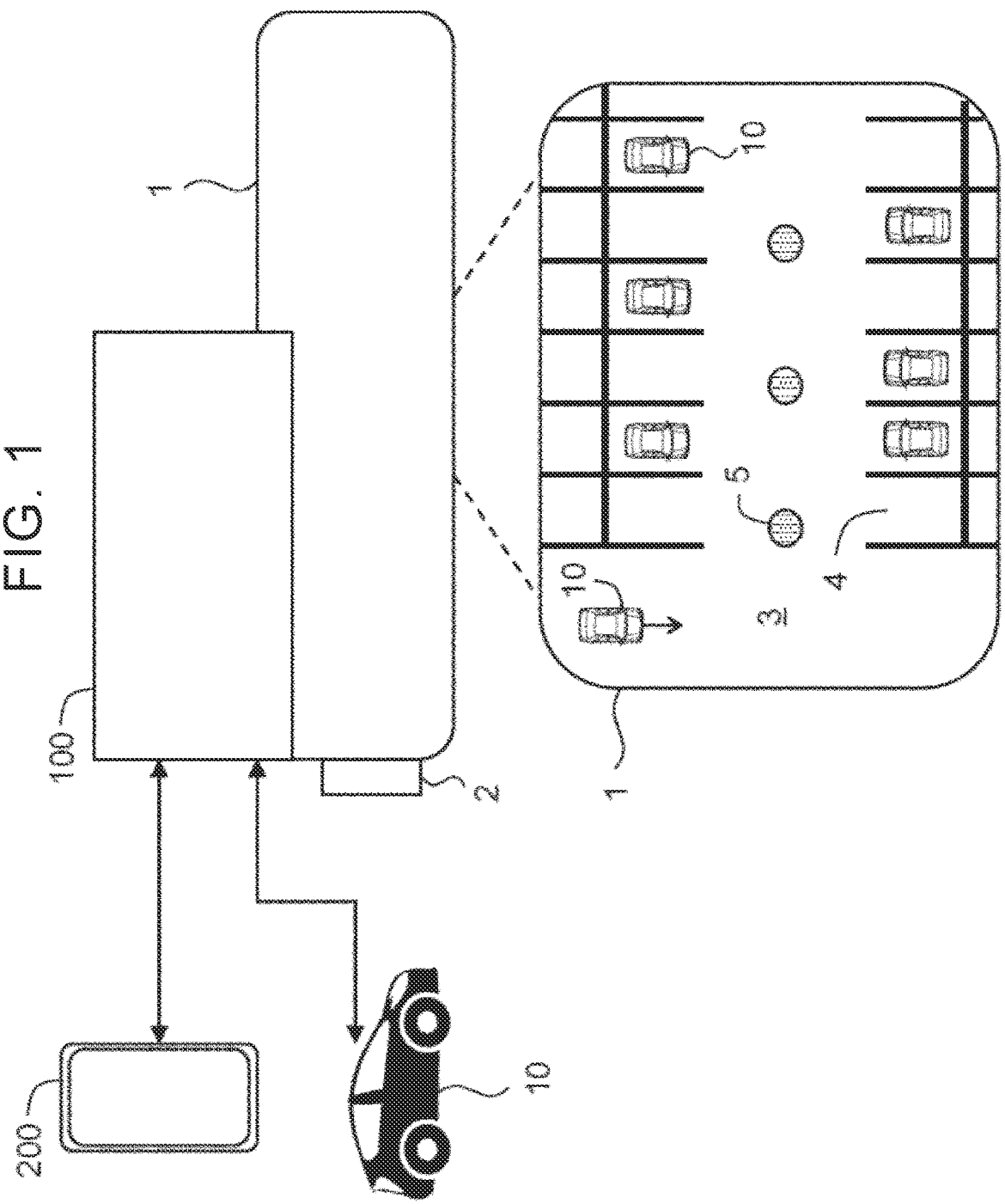
FIG. 1 is a conceptual diagram illustrating an overview of an automated valet parking system according to an embodiment of the present disclosure.

FIG. 1 is a conceptual diagram illustrating an overview of an automated valet parking system 100 according to the present embodiment. The automated valet parking system 100 manages automated valet parking (AVP) in a parking lot 1.

A vehicle adapted to the automated valet parking will be hereinafter referred to as "AVP vehicle 10". The AVP vehicle 10 can communicate with the automated valet parking system 100. The AVP vehicle 10 can also travel without driving operation by a driver at least in the parking lot 1. The AVP vehicle 10 may be an autonomous driving vehicle. When an autonomous traveling robot tows a vehicle that does not have an autonomous driving function to realize the automated valet parking, the combination of the vehicle and the autonomous traveling robot corresponds to the "AVP vehicle 10". In this case, control on the AVP vehicle 10 means control on the autonomous traveling robot.

The parking lot 1 is used by at least the AVP vehicle 10. The parking lot 1 may be used by a general vehicle other than the AVP vehicle 10.

The parking lot 1 includes a boarding/alighting area 2, a passageway 3, and a plurality of parking slots (parking sections) 4. In the boarding/alighting area 2, the AVP vehicle 10 entering the parking lot 1 or the AVP vehicle 10 exiting the parking lot 1 stops. In the boarding/alighting area 2, an occupant gets out of the AVP vehicle 10 and also gets into the AVP vehicle 10. The passageway 3 is an area in which vehicles such as the AVP vehicle 10 and a general vehicle travel. The parking slot 4 is a space for parking a vehicle such as the AVP vehicle 10 or a general vehicle. For example, the parking slots 4 are separated by demarcation lines.

In addition, a plurality of marks 5 is provided in the parking lot 1. The marks 5 are used to guide the AVP vehicle 10 in the parking lot 1. Examples of the marks 5 include markers and pillars.

An example of a flow in which a user X uses the automated valet parking service will be described below. It is assumed that member information of the user X is preregistered in the automated valet parking system 100.

First, the user X makes a reservation for automated valet parking. For example, the user X operates a terminal device 200 to input identification (ID) information of the user X, a desired parking lot 1, a desired date of use, a desired period of use (desired entrance time and desired exit time), and the like. The terminal device 200 transmits reservation information including the input information to the automated valet parking system 100. The automated valet parking system 100 performs a reservation process based on the reservation information. The automated valet parking system 100 transmits a reservation completion notification to the terminal device 200. The automated valet parking system 100 also transmits authentication information associated with the reservation information to the terminal device 200. The terminal device 200 receives the authentication information and holds the received authentication information.

The entrance (check-in) of the AVP vehicle 10 into the parking lot 1 is as follows.

The AVP vehicle 10 carrying the user X arrives and stops at the boarding/alighting area 2 of the parking lot 1. In the boarding/alighting area 2, the user X (and other occupants, if any) gets out of the AVP vehicle 10. Then, the user X requests entrance of the AVP vehicle 10 by using the authentication information held in the terminal device 200. In response to the entrance request, the automated valet parking system 100 authenticates the user X. When the authentication is completed, operation authority of the AVP vehicle 10 is transferred from the user X to the automated valet parking system 100. The automated valet parking system 100 performs an entrance process for the AVP vehicle 10.

In the entrance process, the automated valet parking system 100 communicates with the AVP vehicle 10 and activates the AVP vehicle 10 (ignition ON).

The automated valet parking system 100 allocates an available parking slot 4 to the AVP vehicle 10 with reference to usage of the parking lot 1. Then, the automated valet parking system 100 communicates with the AVP vehicle 10 and transmits an entrance instruction to the AVP vehicle 10. The entrance instruction includes information on the allocated parking slot 4 and map information of the parking lot 1. The automated valet parking system 100 may specify a traveling route from the boarding/alighting area 2 to the allocated parking slot 4. In that case, the entrance instruction includes information on the specified traveling route.

In response to the entrance instruction, the AVP vehicle 10 starts vehicle travel control. Specifically, the AVP vehicle 10 autonomously travels in the passageway 3 from the boarding/alighting area 2 to the allocated parking slot 4, and is autonomously parked in the allocated parking slot 4. At this time, the AVP vehicle 10 may travel along the traveling route specified by the automated valet parking system 100. The automated valet parking system 100 may communicate with the AVP vehicle 10 and remotely control the autonomous traveling of the AVP vehicle 10.

When parking is completed, the AVP vehicle 10 notifies the automated valet parking system 100 about the completion of parking. Alternatively, the automated valet parking system 100 may detect the completion of parking of the AVP vehicle 10 by using infrastructure sensors installed in the parking lot 1. After the parking is completed, the automated valet parking system 100 communicates with the AVP vehicle 10 and stops the operation of the AVP vehicle 10 (ignition OFF). The automated valet parking system 100 holds the information on the parking slot 4 of the AVP vehicle 10 in association with the user X.

The exit (check-out) of the AVP vehicle 10 from the parking lot 1 is as follows.

The user X requests exit of the AVP vehicle 10 by using the terminal device 200. The exit request includes the authentication information, information on the boarding/alighting area 2 specified by the user X, and the like. In response to the exit request, the automated valet parking system 100 authenticates the user X and performs an exit process for the AVP vehicle 10.

In the exit process, the automated valet parking system 100 communicates with the AVP vehicle 10 and activates the AVP vehicle 10 (ignition ON).

The automated valet parking system 100 communicates with the AVP vehicle 10 and transmits an exit instruction to the AVP vehicle 10. The exit instruction includes the information on the boarding/alighting area 2 specified by the user X and the map information of the parking lot 1. The automated valet parking system 100 may specify a traveling route from the parking slot 4 to the boarding/alighting area 2. In that case, the exit instruction includes information on the specified traveling route.

In response to the exit instruction, the AVP vehicle 10 starts the vehicle travel control. Specifically, the AVP vehicle 10 autonomously travels in the passageway 3 from the parking slot 4 to the specified boarding/alighting area 2. At this time, the AVP vehicle 10 may travel along the traveling route specified by the automated valet parking system 100. The automated valet parking system 100 may communicate with the AVP vehicle 10 and remotely control the autonomous traveling of the AVP vehicle 10.

The AVP vehicle 10 arrives and stops at the boarding/alighting area 2 specified by the user X. The operation authority of the AVP vehicle 10 is transferred from the automated valet parking system 100 to the user X. The user X (and other occupants, if any) gets into the AVP vehicle 10. The AVP vehicle 10 starts traveling toward the next destination.

Figure 2:
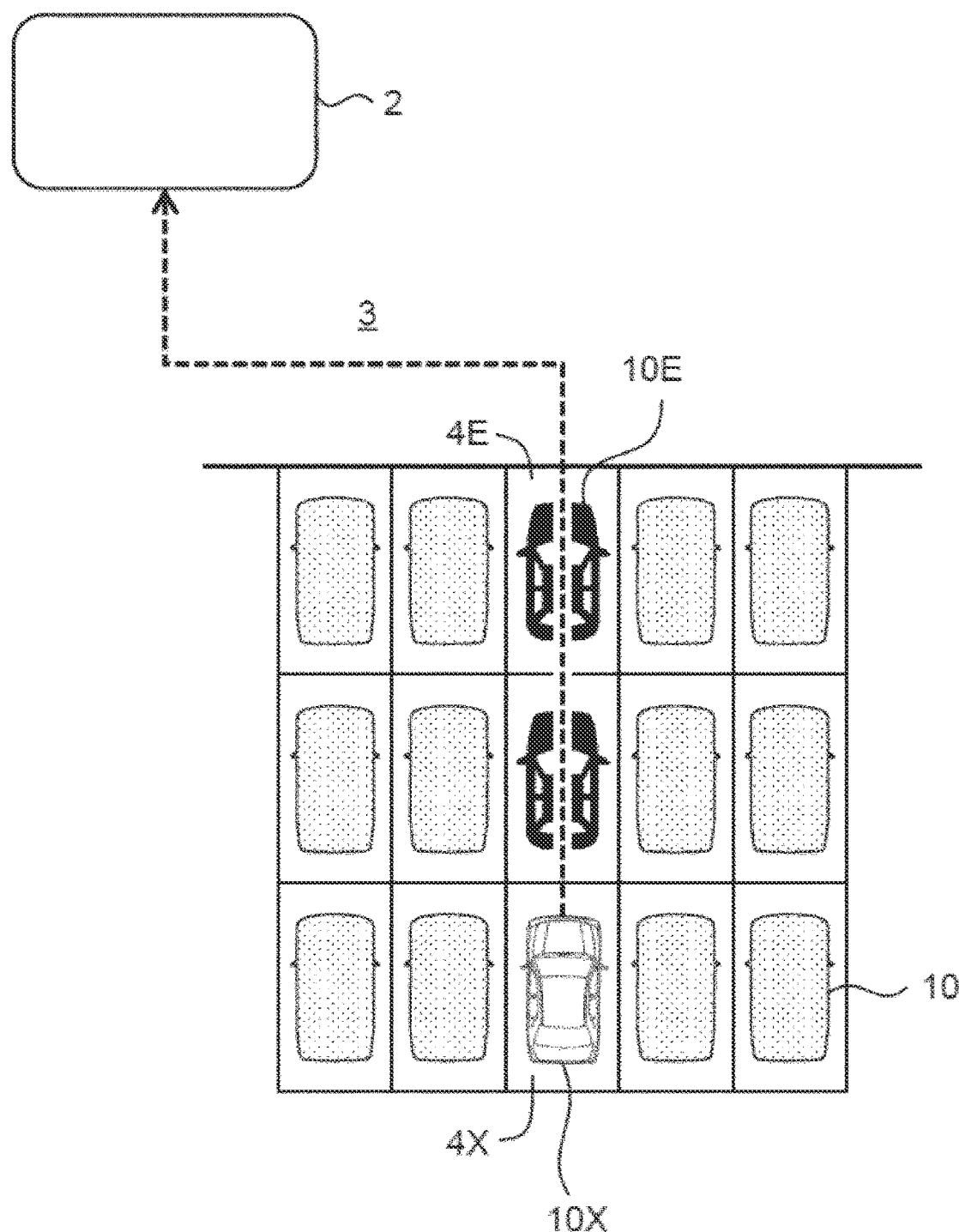
FIG. 2 is a conceptual diagram illustrating an example of a parking method for AVP vehicles according to the embodiment of the present disclosure.

2. Vehicle Control Process During Exit 2-1. Exiting Vehicle and Retreating Vehicle FIG. 2 is a conceptual diagram illustrating an example of a parking method for the AVP vehicles 10. In the automated valet parking, drivers do not get into and out of vehicles after parking. Therefore, as illustrated in FIG. 2, many AVP vehicles 10 can be parked at close intervals at front, back, right, and left. That is, a large number of parking slots 4 may be provided without clearances and the AVP vehicles 10 may be parked in those parking slots 4. This parking method may also be called "packed parking". The packed parking is useful from the viewpoint of efficient use of parking spaces.

It is assumed that a certain parked AVP vehicle 10 is caused to exit the parking lot 1. The parked AVP vehicle 10 that is an exit target, that is, the AVP vehicle 10 scheduled to exit the parking lot 1 is hereinafter referred to as "exiting vehicle 10X". The exiting vehicle 10X appears in response to an exit request from the user. Alternatively, the exiting vehicle 10X automatically appears before a scheduled exit time specified in advance by the user. The exiting vehicle 10X is parked in a parking slot 4X. For the exit of the exiting vehicle 10X, the exiting vehicle 10X needs to move from the parking slot 4X to the boarding/alighting area 2 via the passageway 3.

In the situation illustrated in FIG. 2, other parking slots 4E are present between the parking slot 4X and the passageway 3, and other AVP vehicles 10E are parked in the parking slots 4E. That is, the other AVP vehicles 10E are parked to obstruct a space that is in front of the exiting vehicle 10X. The AVP vehicles 10E hinder (block) the exit movement of the exiting vehicle 10X. Before moving the exiting vehicle 10X, it is necessary to temporarily move (retreat) the AVP vehicles 10E from the parking slots 4E. In that sense, the AVP vehicle 10E that needs to move (retreat) in order to move the exiting vehicle 10X is hereinafter referred to as "retreating vehicle 10E".

When one or more retreating vehicles 10E are present, the retreating vehicles 10E first start moving from the parking slots 4E. Then, the exiting vehicle 10X starts moving from the parking slot 4X. The exiting vehicle 10X may start moving before the movement (retreat) of the retreating vehicles 10E is completed. Typically, the exiting vehicle 10X starts moving from the parking slot 4X immediately after the retreating vehicles 10E start moving.

2-2. Traveling Routes

Next, consideration is made about traveling routes of the AVP vehicles 10 in the parking lot 1. The traveling route is determined by at least a vehicle position and a traveling direction of the AVP vehicle 10. The vehicle position of the AVP vehicle 10 on the traveling route may be given as a function of time. That is, the traveling route may geometrically indicate only a passing position of the AVP vehicle 10, or may indicate a position of the AVP vehicle 10 at a specific timing.

Figure 3:
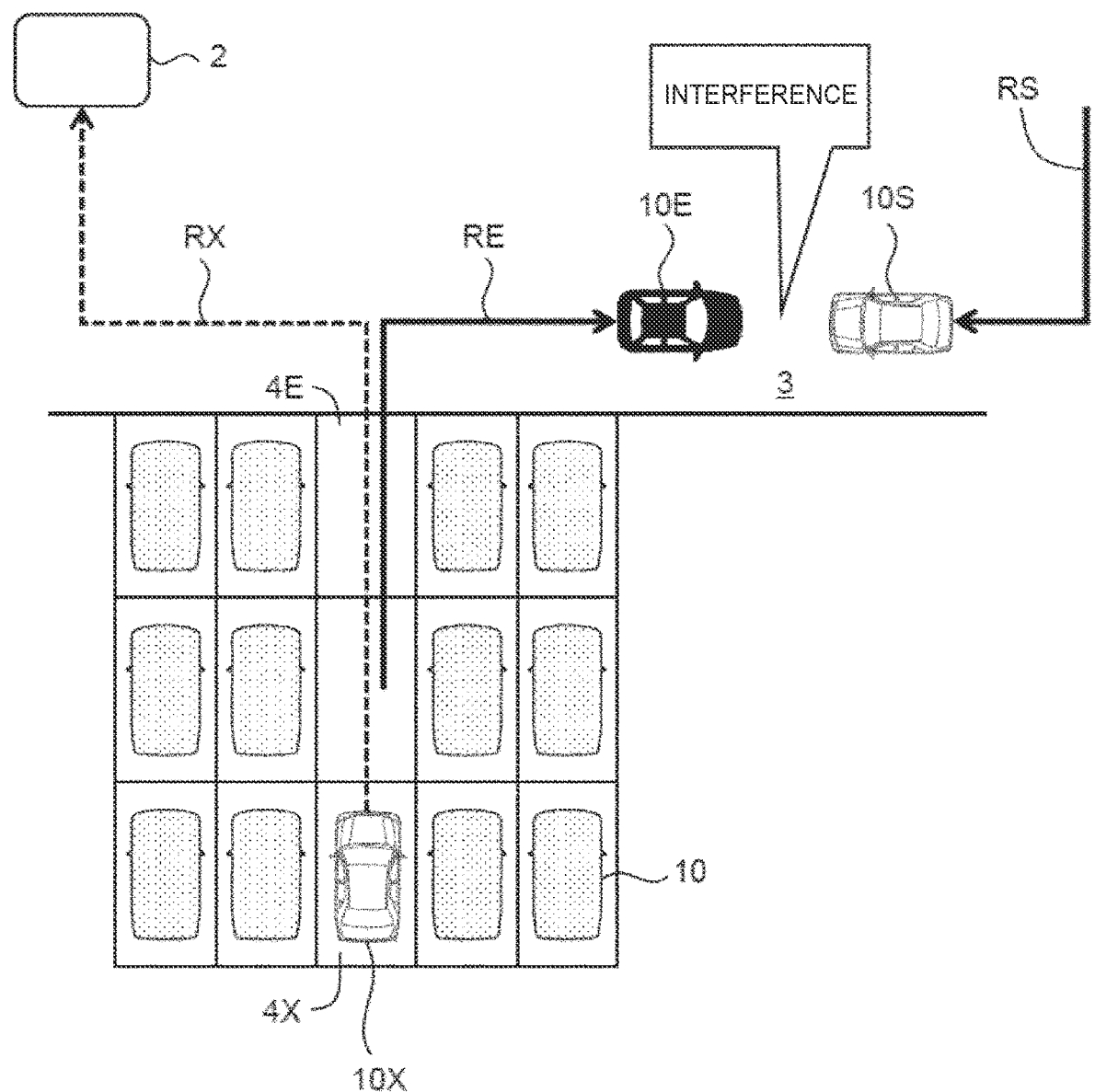
FIG. 3 is a conceptual diagram illustrating the AVP vehicles and traveling routes according to the embodiment of the present disclosure.

FIG. 3 is a conceptual diagram illustrating traveling routes of the AVP vehicles 10 in the parking lot 1. An "exiting route RX" is a traveling route when the exiting vehicle 10X exits the parking lot 1. That is, the exiting route RX is a traveling route when the exiting vehicle 10X moves from the parking slot 4X to the boarding/alighting area 2. A "retreating route RE" is a traveling route of the retreating vehicle 10E when the retreating vehicle 10E is moved in order to move the exiting vehicle 10X. That is, the retreating route RE is a traveling route when the retreating vehicle 10E retreats from the parking slot 4E.

When the retreating vehicle 10E moves, any other AVP vehicle 10 may be traveling in the passageway 3 in the parking lot 1. The other traveling AVP vehicle 10 is hereinafter referred to as "peripheral vehicle 10S". For example, the peripheral vehicle 10S is under the entrance process. Alternatively, the peripheral vehicle 10S is under the exit process. A "peripheral vehicle route RS" is a traveling route of the peripheral vehicle 10S in the parking lot 1.

By the movement of the retreating vehicle 10E hindering the traveling of another AVP vehicle 10 (exiting vehicle 10X or peripheral vehicle 10S), a traffic flow in the parking lot 1 is disturbed or stagnated. Particularly when the movement of the retreating vehicle 10E hinders the exit of the exiting vehicle 10X, the period required for the exit process increases. This causes a decrease in processing efficiency associated with the automated valet parking.

The present embodiment proposes a technology for minimizing influence of the movement of the retreating vehicle 10E on the traffic flow in the parking lot 1. Therefore, the retreating route RE of the retreating vehicle 10E is set to minimize interference with the traveling route (exiting route RX or peripheral vehicle route RS) of the other AVP vehicle 10 (exiting vehicle 10X or peripheral vehicle 10S). The "interference" means hindrance to the movement of the other AVP vehicle 10. In other words, the "interference" means that the other AVP vehicle 10 is forced to decelerate unnecessarily.

The retreating route RE useful from the above viewpoint is hereinafter referred to as "non-interfering route RN". Various examples of the non-interfering route RN will be described below.

Figure 4:
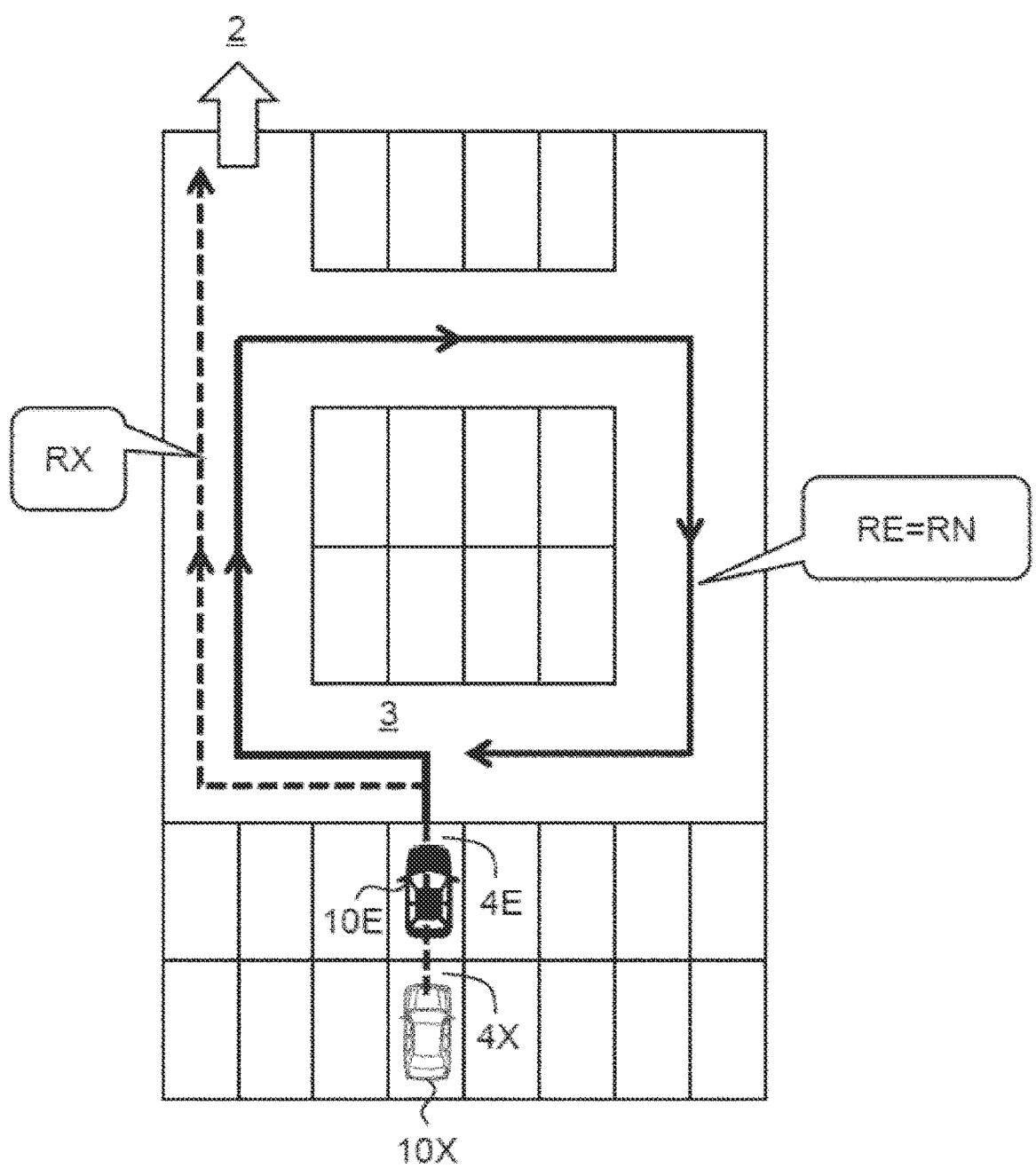
FIG. 4 is a conceptual diagram illustrating an example of a non-interfering route that does not interfere with an exiting route according to the embodiment of the present disclosure.

2-3. Examples of Non-Interfering Route 2-3-1. Non-Interfering Route that does not Interfere with Exiting Route FIG. 4 is a conceptual diagram illustrating an example of a non-interfering route RN that does not interfere with the exiting route RX. In the example illustrated in FIG. 4, the retreating route RE (non-interfering route RN) and the exiting route RX partially overlap each other. At a position where the retreating route RE (non-interfering route RN) and the exiting route RX overlap each other, the traveling direction of the retreating vehicle 10E and the traveling direction of the exiting vehicle 10X coincide with each other. That is, the retreating vehicle 10E does not face the exiting vehicle 10X. Therefore, the movement of the retreating vehicle 10E does not hinder the exit of the exiting vehicle 10X.

In the example illustrated in FIG. 4, the exiting vehicle 10X and the retreating vehicle 10E travel in the same direction. Therefore, it is likely that an orderly traffic flow is made in the parking lot 1. This contributes to improvement in movement efficiency of the AVP vehicles 10 as a whole in the parking lot 1.

Figure 5:
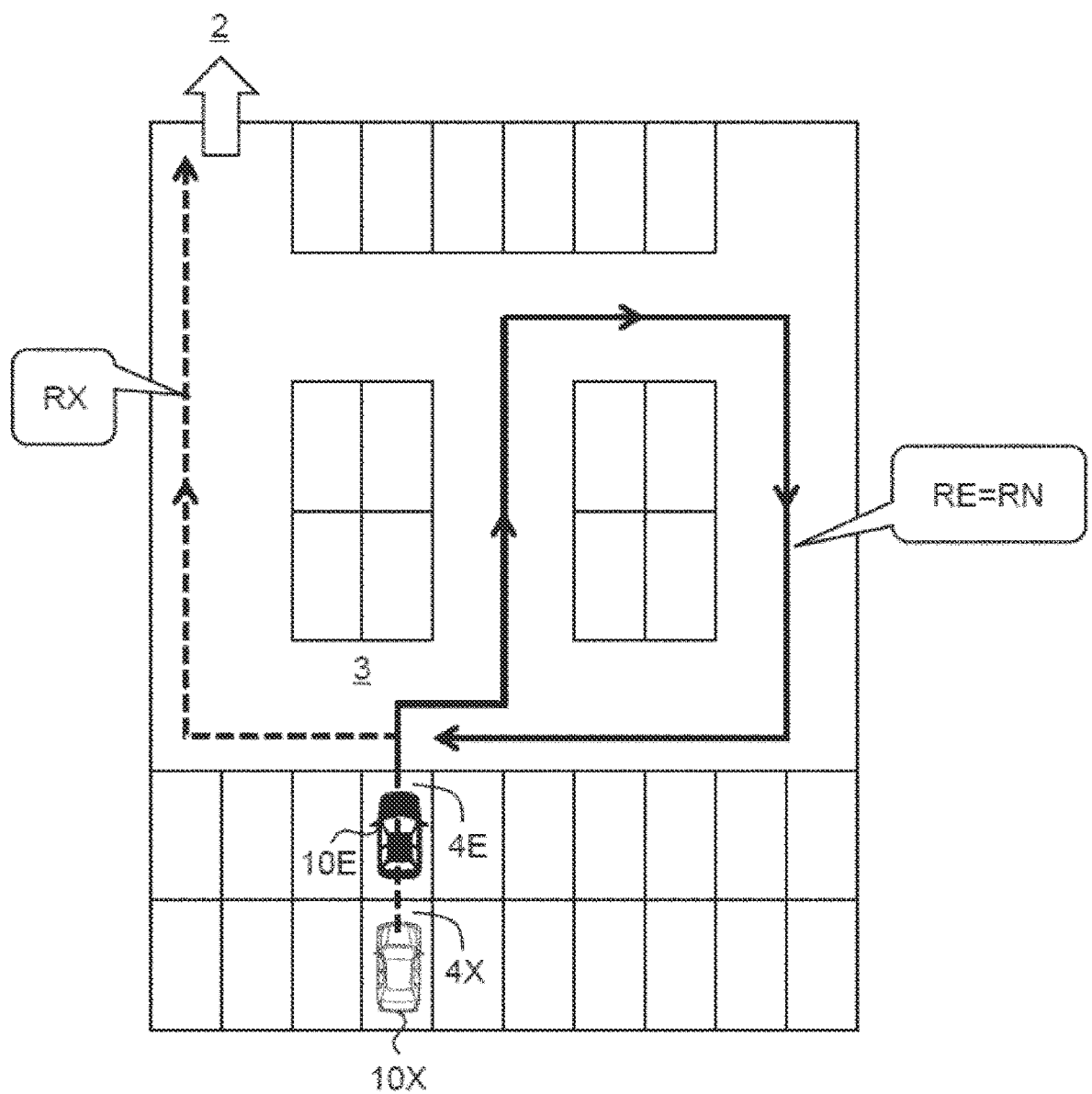
FIG. 5 is a conceptual diagram illustrating another example of the non-interfering route that does not interfere with the exiting route according to the embodiment of the present disclosure.

FIG. 5 is a conceptual diagram illustrating another example of the non-interfering route RN that does not interfere with the exiting route RX. In the example illustrated in FIG. 5, the retreating route RE (non-interfering route RN) and the exiting route RX do not basically intersect each other on the passageway 3. Therefore, the movement of the retreating vehicle 10E does not hinder the exit of the exiting vehicle 10X. In the vicinity of the parking slot 4E where the retreating vehicle 10E is parked, the retreating route RE (non-interfering route RN) and the exiting route RX slightly overlap each other. Since the exiting vehicle 10X starts moving from the parking slot 4X after the retreating vehicle 10E has started moving from the parking slot 4E, the overlap in the vicinity of the parking slot 4E does not affect the exit of the exiting vehicle 10X.

Figure 6:
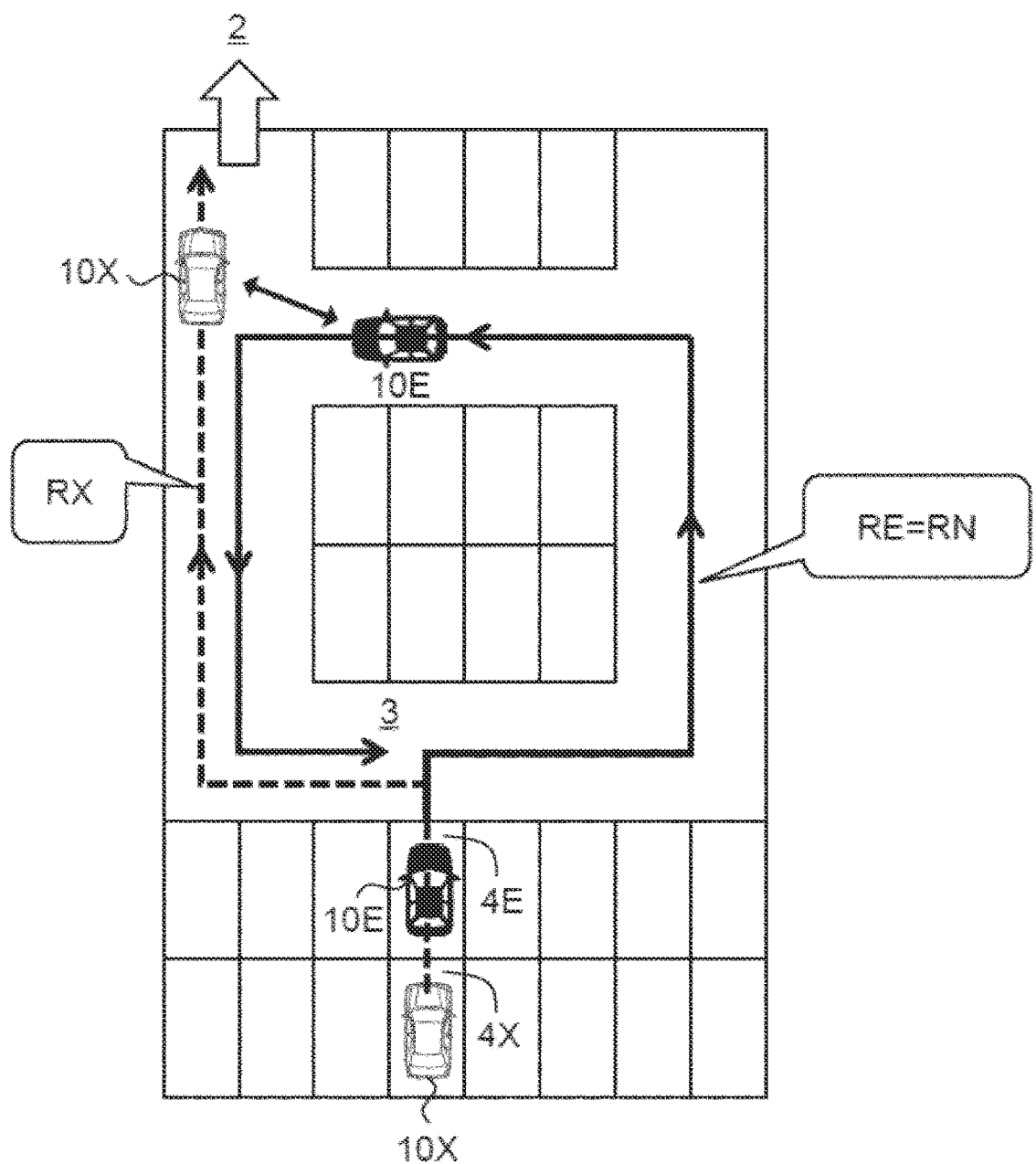
FIG. 6 is a conceptual diagram illustrating still another example of the non-interfering route that does not interfere with the exiting route according to the embodiment of the present disclosure.

FIG. 6 is a conceptual diagram illustrating still another example of the non-interfering route RN that does not interfere with the exiting route RX. When the vehicle position on the traveling route is represented by a function of time, it is possible to grasp a position of the AVP vehicle 10 at a specific timing. As illustrated in FIG. 6, even if the traveling direction of the retreating vehicle 10E and the traveling direction of the exiting vehicle 10X are opposite at the same position, no problem arises as long as the timings of the two vehicles passing through the position differ from each other by a predetermined amount or more. To generalize, it is appropriate that the retreating vehicle 10E moving along the retreating route RE (non-interfering route RN) and the exiting vehicle 10X moving along the exiting route RX be separated by a predetermined distance or more at any time. Also in this case, the movement of the retreating vehicle 10E does not hinder the exit of the exiting vehicle 10X.

Figure 7:
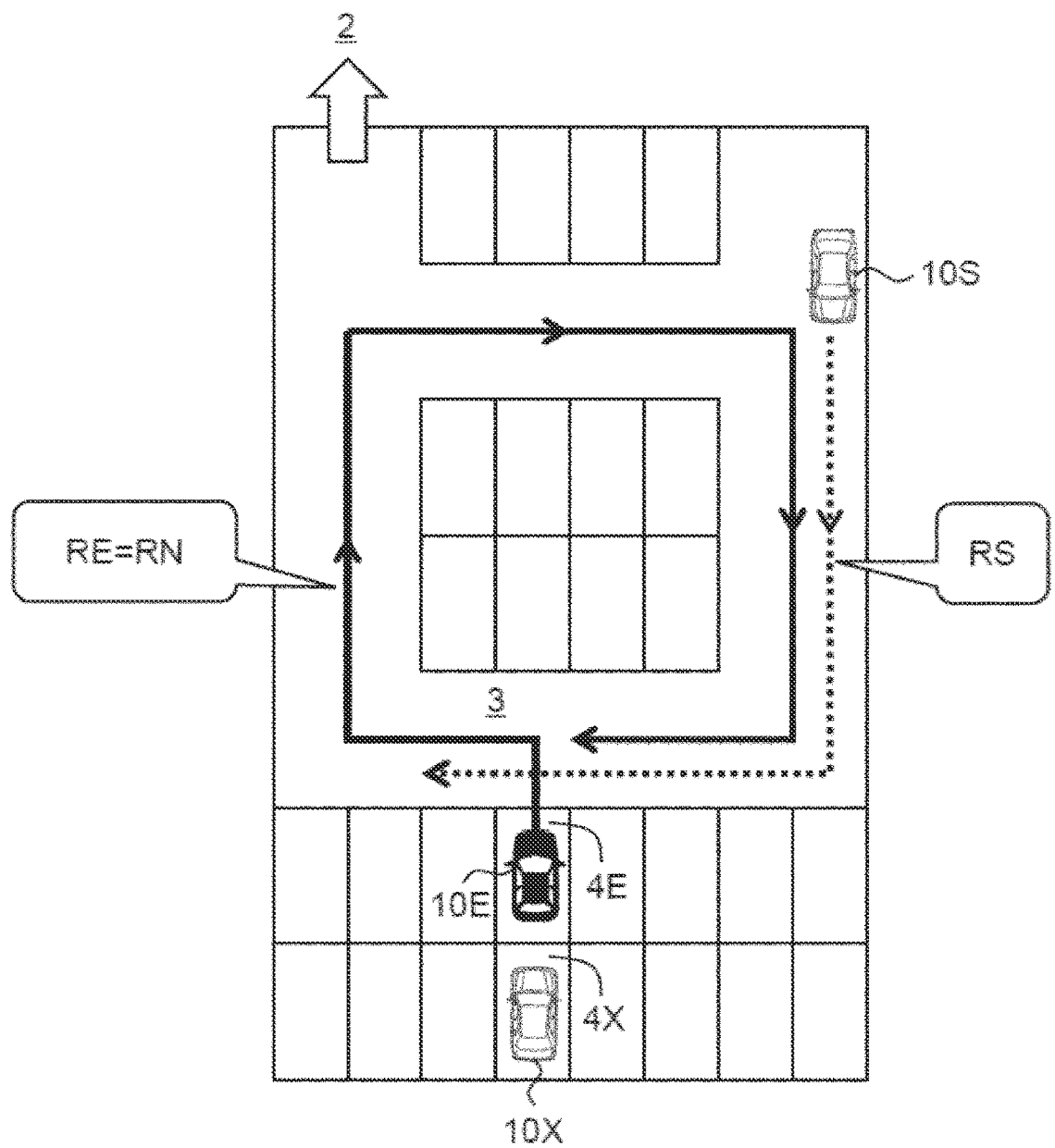
FIG. 7 is a conceptual diagram illustrating an example of a non-interfering route that does not interfere with a peripheral vehicle route according to the embodiment of the present disclosure.

2-3-2. Non-Interfering Route that does not Interfere with Peripheral Vehicle Route FIG. 7 is a conceptual diagram illustrating an example of a non-interfering route RN that does not interfere with the peripheral vehicle route RS. In the example illustrated in FIG. 7, the retreating route RE (non-interfering route RN) and the peripheral vehicle route RS partially overlap each other. At a position where the retreating route RE (non-interfering route RN) and the peripheral vehicle route RS overlap each other, the traveling direction of the retreating vehicle 10E and the traveling direction of the peripheral vehicle 10S coincide with each other. That is, the retreating vehicle 10E does not face the peripheral vehicle 10S. Therefore, the movement of the retreating vehicle 10E does not hinder the traveling of the peripheral vehicle 10S.

In the example illustrated in FIG. 7, the peripheral vehicle 10S and the retreating vehicle 10E travel in the same direction. Therefore, it is likely that an orderly traffic flow is made in the parking lot 1. This contributes to improvement in movement efficiency of the AVP vehicles 10 as a whole in the parking lot 1.

Figure 8:
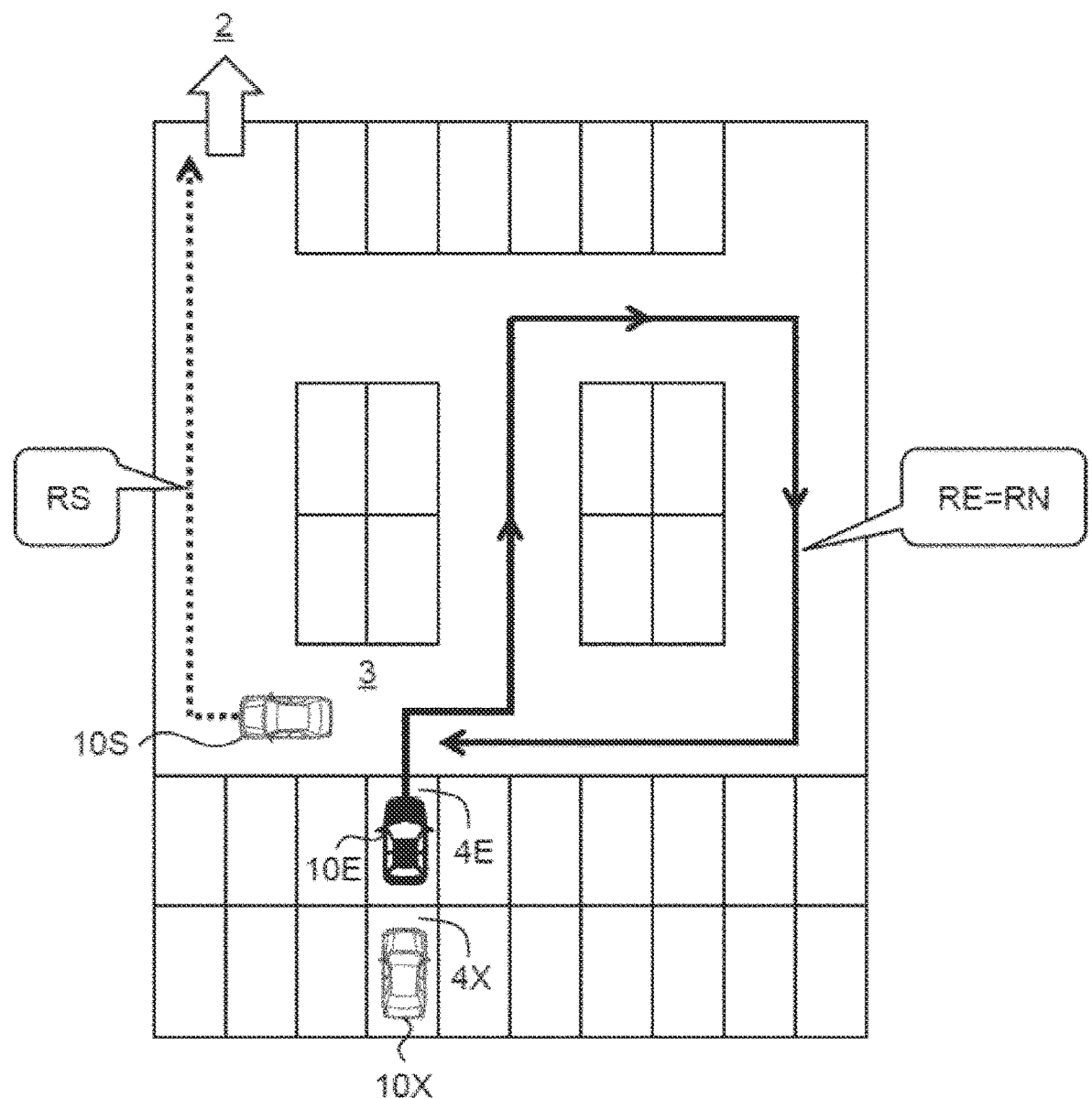
FIG. 8 is a conceptual diagram illustrating another example of the non-interfering route that does not interfere with the peripheral vehicle route according to the embodiment of the present disclosure.

FIG. 8 is a conceptual diagram illustrating another example of the non-interfering route RN that does not interfere with the peripheral vehicle route RS. In the example illustrated in FIG. 8, the retreating route RE (non-interfering route RN) and the peripheral vehicle route RS do not intersect each other. Therefore, the movement of the retreating vehicle 10E does not hinder the traveling of the peripheral vehicle 10S.

Figure 9:
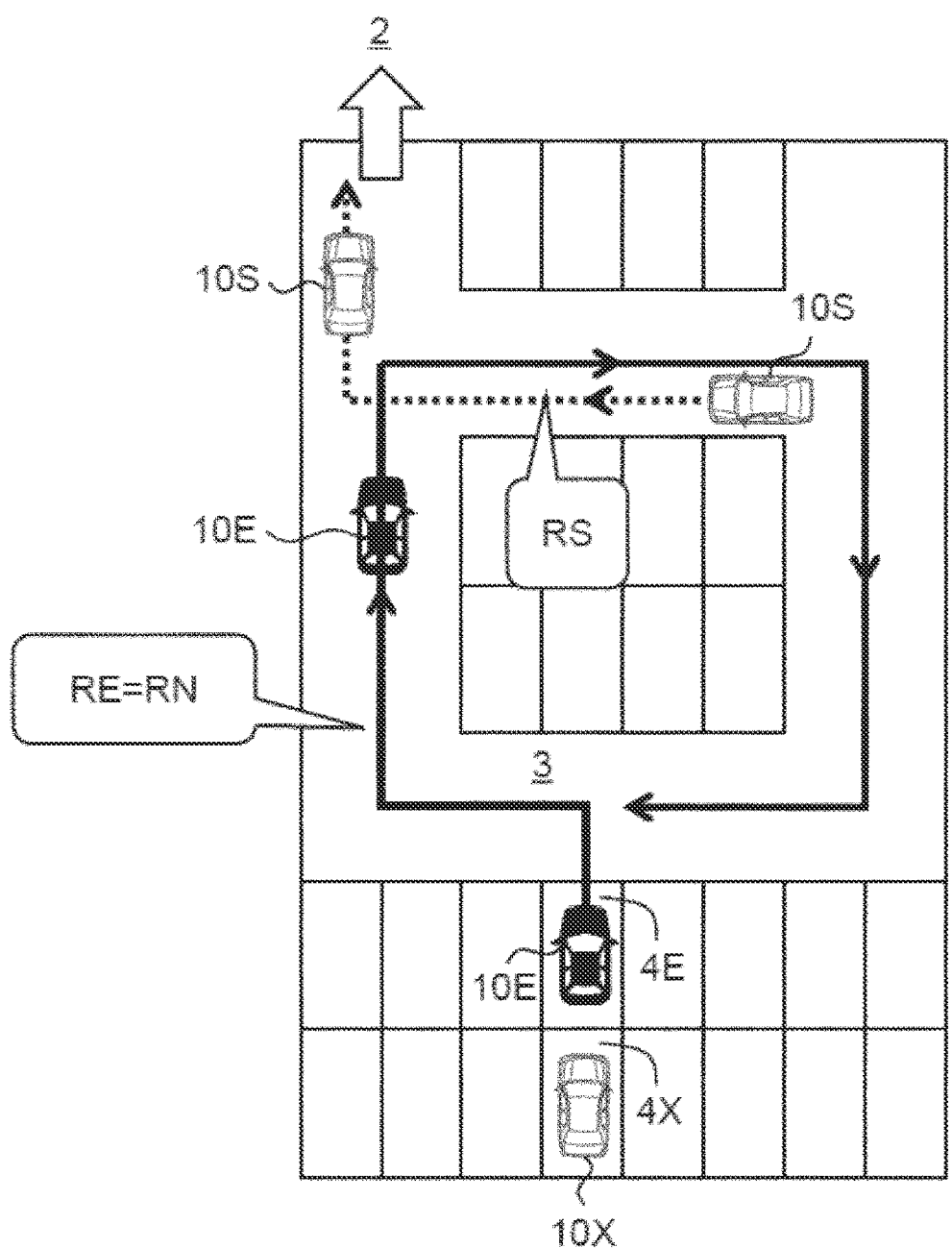
FIG. 9 is a conceptual diagram illustrating still another example of the non-interfering route that does not interfere with the peripheral vehicle route according to the embodiment of the present disclosure.

FIG. 9 is a conceptual diagram illustrating still another example of the non-interfering route RN that does not interfere with the peripheral vehicle route RS. When the vehicle position on the traveling route is represented by a function of time, it is possible to grasp a position of the AVP vehicle 10 at a specific timing. As illustrated in FIG. 9, even if the traveling direction of the retreating vehicle 10E and the traveling direction of the peripheral vehicle 10S are opposite at the same position, no problem arises as long as the timings of the two vehicles passing through the position differ from each other by a predetermined amount or more. To generalize, it is appropriate that the retreating vehicle 10E moving along the retreating route RE (non-interfering route RN) and the peripheral vehicle 10S moving along the peripheral vehicle route RS be separated by a predetermined distance or more at any time. Also in this case, the movement of the retreating vehicle 10E does not hinder the traveling of the peripheral vehicle 10S.

2-3-3. Circling Route and Relocation Route

Figure 10:
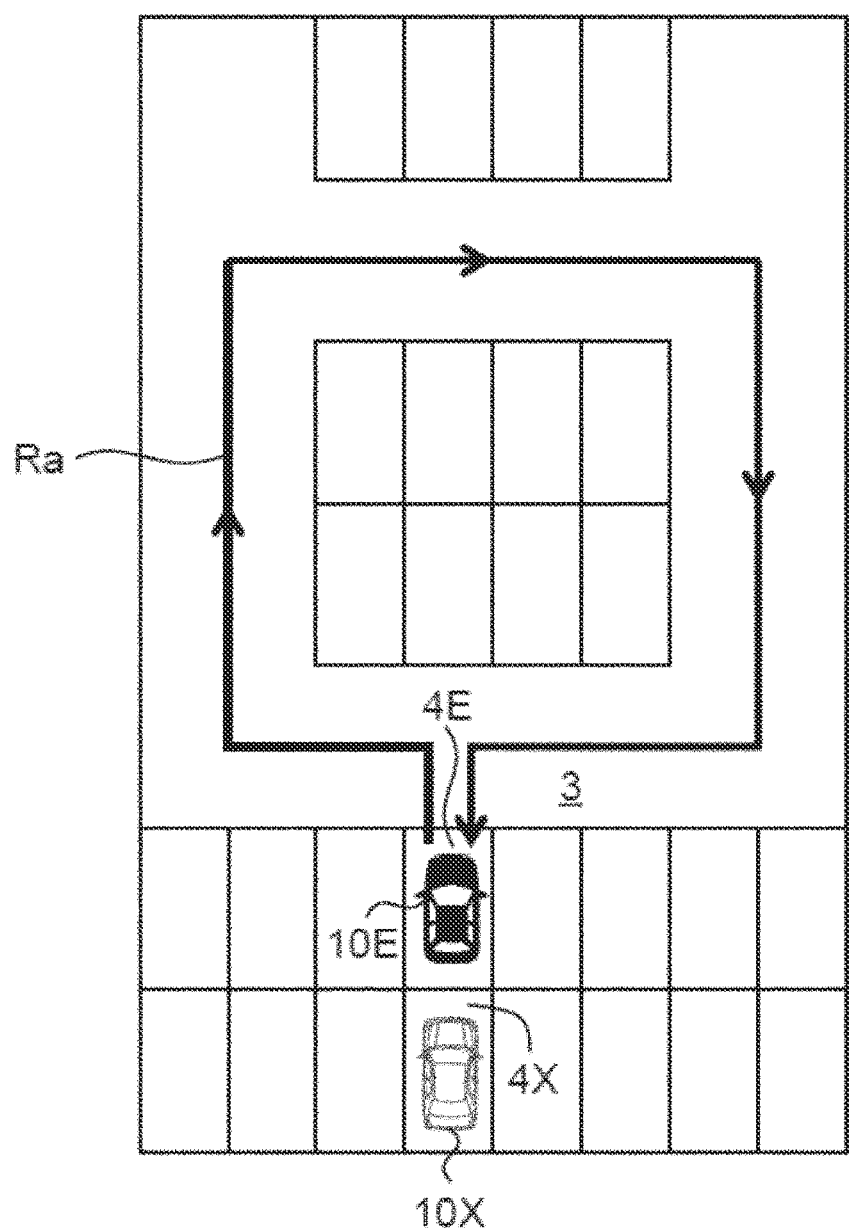
FIG. 10 is a conceptual diagram illustrating an example of a circling route according to the embodiment of the present disclosure.

FIG. 10 is a conceptual diagram illustrating a "circling route Ra". The circling route Ra is a retreating route RE in which the retreating vehicle 10E moves from the original parking slot 4E and then returns to the original parking slot 4E without traveling in backward. The circling route Ra can be searched based on the map information of the parking lot 1. The non-interfering route RN may be determined to be the circling route Ra. In that case, there is no need to change allocation of the parking slot 4 for the retreating vehicle 10E. This is useful from the viewpoint of management of the parking slots 4.

Figure 11:
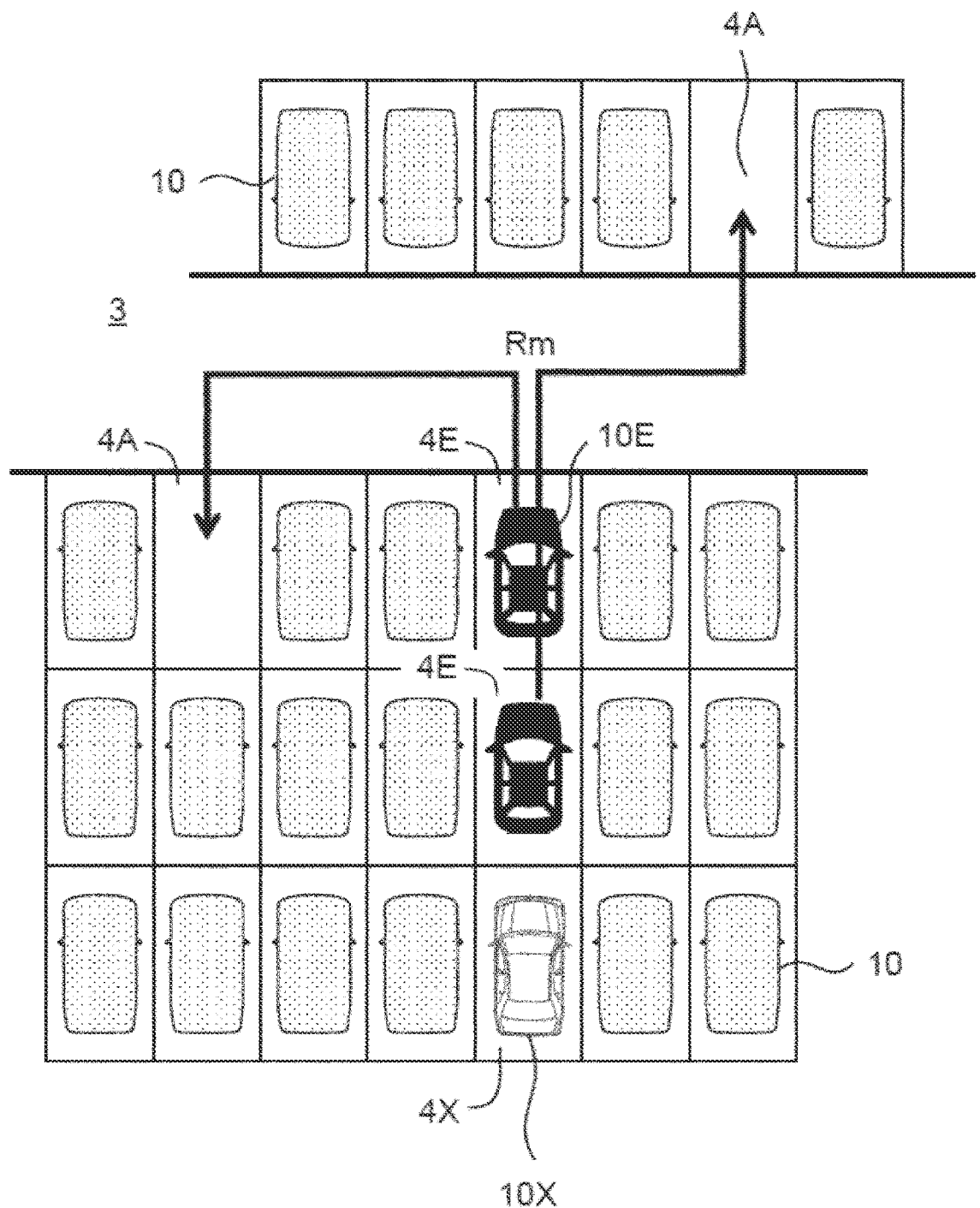
FIG. 11 is a conceptual diagram illustrating an example of a relocation route according to the embodiment of the present disclosure.

FIG. 11 is a conceptual diagram illustrating a "relocation route Rm". The relocation route Rm is a retreating route RE in which the retreating vehicle 10E moves (relocates) from the original parking slot 4E to another available parking slot 4A. The relocation route Rm can be searched based on the map information of the parking lot 1 and usage (availability) of each parking slot 4. The non-interfering route RN may be determined to be the relocation route Rm. In that case, the moving distance of the retreating vehicle 10E is relatively short. This is useful from the viewpoint of reduction in energy consumption of the retreating vehicle 10E.

Priority may be set for either one of the circling route Ra and the relocation route Rm. When a plurality of retreating vehicles 10E is present, the retreating routes RE of some retreating vehicles 10E may be set to be the circling routes Ra, and the retreating routes RE of the other retreating vehicles 10E may be set to be the relocation routes Rm.

2-4. Retreating Route Determination Process

According to this embodiment, the non-interfering route RN that does not interfere with at least the exiting route RX is searched. The non-interfering route RN is determined as the retreating route RE of the retreating vehicle 10E. As the non-interfering route RN that does not interfere with at least the exiting route RX, a "first non-interfering route RN1" and a "second non-interfering route RN2" described below are conceivable.

2-4-1. First Non-Interfering Route

The first non-interfering route RN1 is a retreating route RE that interferes with neither the exiting route RX nor the peripheral vehicle route RS. That is, the first non-interfering route RN1 is a combination of any one of the non-interfering routes RN exemplified in FIGS. 4 to 6 and any one of the non-interfering routes RN exemplified in FIGS. 7 to 9. Any combination is possible.

Figure 12:
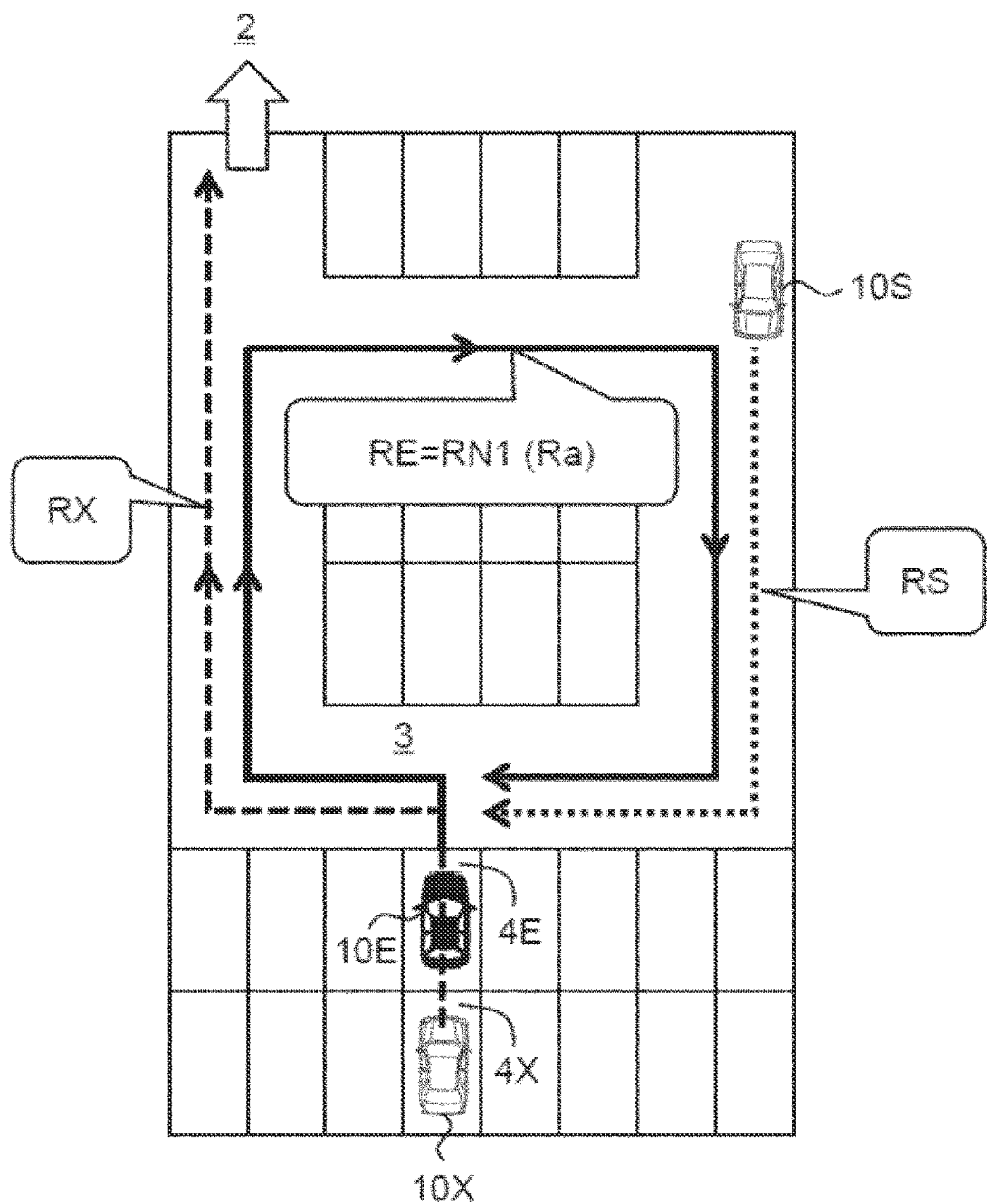
FIG. 12 is a conceptual diagram illustrating an example of a first non-interfering route according to the embodiment of the present disclosure.

FIG. 12 is a conceptual diagram illustrating an example of the first non-interfering route RN1. The first non-interfering route RN1 illustrated in FIG. 12 is a non-interfering route RN that does not interfere with the exiting route RX illustrated in FIG. 4, and is also a non-interfering route RN that does not interfere with the peripheral vehicle route RS illustrated in FIG. 7. The first non-interfering route RN1 illustrated in FIG. 12 is also the circling route Ra.

Figure 13:
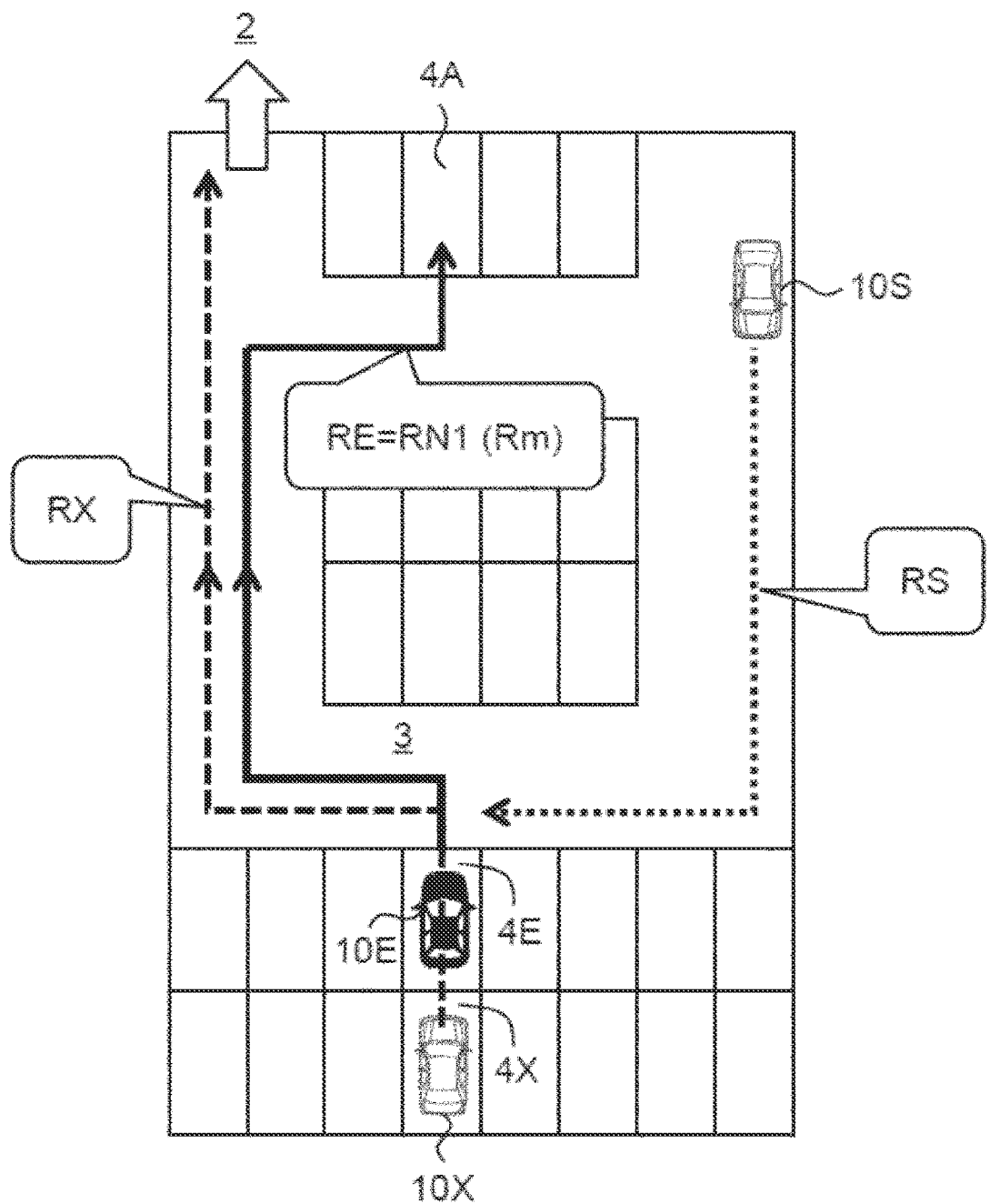
FIG. 13 is a conceptual diagram illustrating another example of the first non-interfering route according to the embodiment of the present disclosure.

FIG. 13 is a conceptual diagram illustrating another example of the first non-interfering route RN1. The first non-interfering route RN1 illustrated in FIG. 13 corresponds to a part of the first non-interfering route RN1 illustrated in FIG. 12, and is the relocation route Rm.

Figure 14:
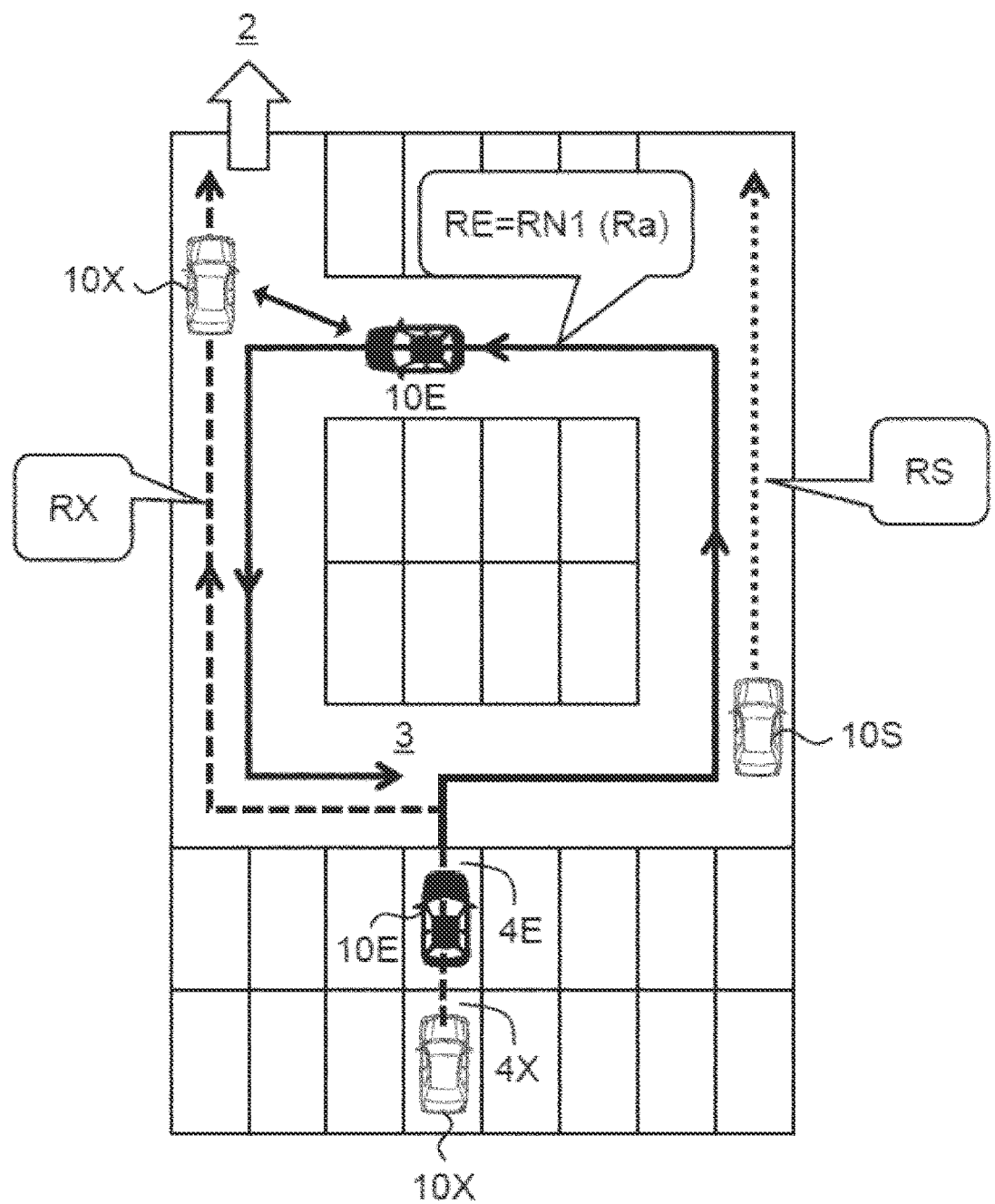
FIG. 14 is a conceptual diagram illustrating still another example of the first non-interfering route according to the embodiment of the present disclosure.

FIG. 14 is a conceptual diagram illustrating still another example of the first non-interfering route RN1. The first non-interfering route RN1 illustrated in FIG. 14 is a non-interfering route RN that does not interfere with the exiting route RX illustrated in FIG. 6, and is also a non-interfering route RN that does not interfere with the peripheral vehicle route RS illustrated in FIG. 7. The first non-interfering route RN1 illustrated in FIG. 14 is also the circling route Ra.

When the first non-interfering route RN1 is present, the first non-interfering route RN1 is determined as the retreating route RE of the retreating vehicle 10E. As a result, it is possible to suppress the influence of the movement of the retreating vehicle 10E on the other AVP vehicles 10 and the traffic flow in the parking lot 1. That is, it is possible to suppress the disturbance or stagnation of the traffic flow in the parking lot 1. Therefore, the decrease in processing efficiency associated with the automated valet parking is suppressed.

In the case of the first non-interfering routes RN1 exemplified in FIGS. 12 and 13, all the exiting vehicle 10X, the retreating vehicle 10E, and the peripheral vehicle 10S travel in the same direction. Therefore, it is likely that an orderly traffic flow is made in the parking lot 1. This contributes to improvement in movement efficiency of the AVP vehicles 10 as a whole in the parking lot 1.

2-4-2. Second Non-Interfering Route

The second non-interfering route RN2 is a retreating route RE that may interfere with the peripheral vehicle route RS but does not interfere with at least the exiting route RX. If the first non-interfering route RN1 is not present, the second non-interfering route RN2 is determined as the retreating route RE of the retreating vehicle 10E as the second best measure. Thus, it is possible to minimize at least the influence of the movement of the retreating vehicle 10E on the exit of the exiting vehicle 10X.

Figure 15:
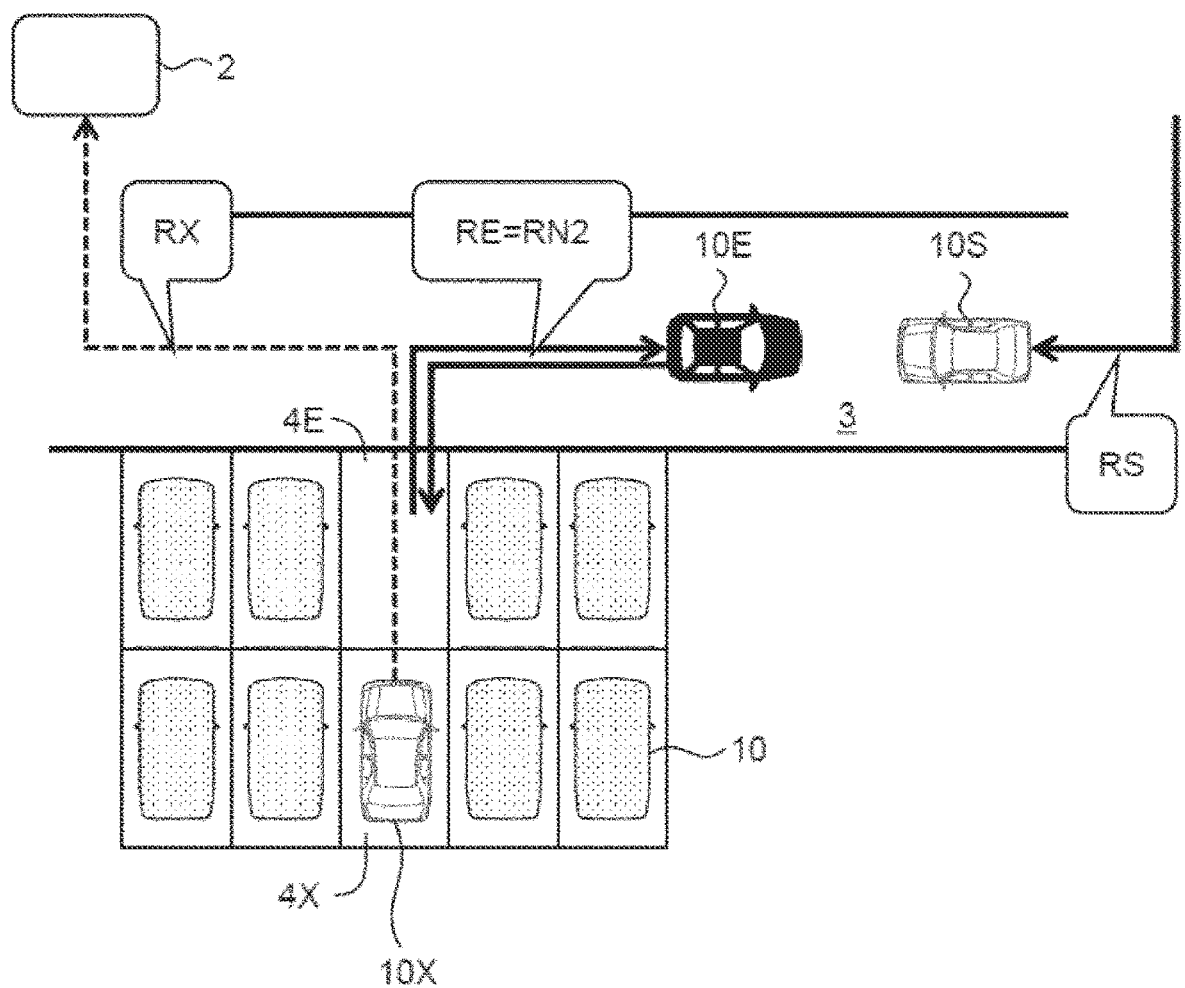
FIG. 15 is a conceptual diagram illustrating an example of a second non-interfering route according to the embodiment of the present disclosure.

FIG. 15 is a conceptual diagram illustrating an example of the second non-interfering route RN2. In the example illustrated in FIG. 15, the retreating vehicle 10E moves slightly to the right and stops after exiting the parking slot 4E into the passageway 3. Subsequently, the exiting vehicle 10X moves to the left toward the boarding/alighting area 2 after exiting the parking slot 4X into the passageway 3. Then, the retreating vehicle 10E travels in backward and returns to the original parking slot 4E. Meanwhile, the peripheral vehicle 10S waits on the passageway 3.

Figure 16:
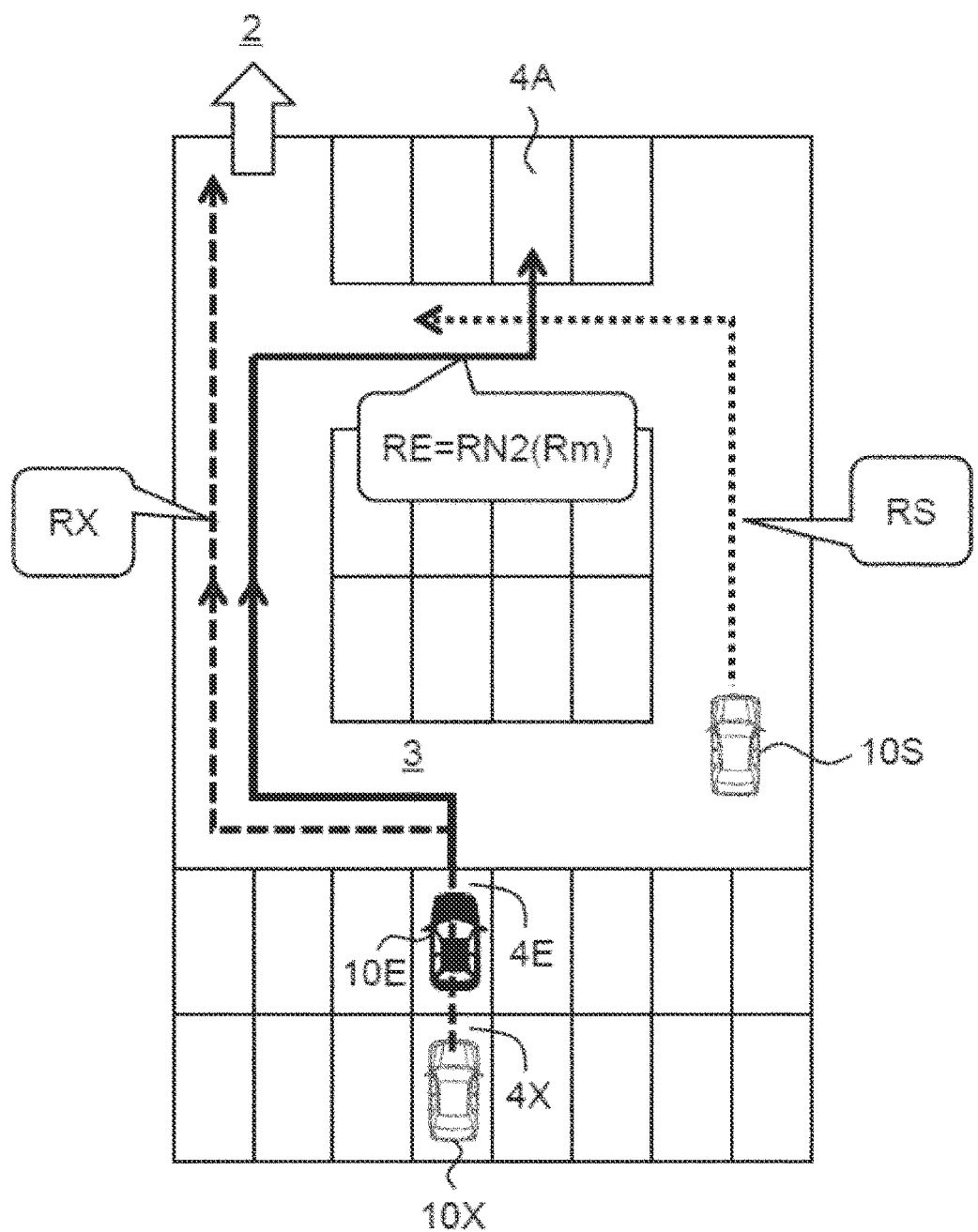
FIG. 16 is a conceptual diagram illustrating another example of the second non-interfering route according to the embodiment of the present disclosure.

FIG. 16 is a conceptual diagram illustrating another example of the second non-interfering route RN2. The second non-interfering route RN2 illustrated in FIG. 16 is a non-interfering route RN that does not interfere with the exiting route RX illustrated in FIG. 4, and is the relocation route Rm. This second non-interfering route RN2 interferes with the peripheral vehicle route RS of the peripheral vehicle 10S. Therefore, the peripheral vehicle 10S may decelerate or stop on the passageway 3.

The retreating route RE is determined for each of one or more retreating vehicles 10E. When a plurality of retreating vehicles 10E is present, the retreating routes RE of some retreating vehicles 10E may be the first non-interfering routes RN1, and the retreating routes RE of the other retreating vehicles 10E may be the second non-interfering routes RN2.

2-5. Effects

As described above, according to the present embodiment, when any retreating vehicle 10E needs to move for the exit of the exiting vehicle 10X, the retreating route RE of the retreating vehicle 10E is determined. In the determination of the retreating route RE, at least the exiting route RX of the exiting vehicle 10X is taken into consideration. The non-interfering route RN that does not interfere with at least the exiting route RX is determined as the retreating route RE of the retreating vehicle 10E. As a result, it is possible to suppress the influence of the movement of the retreating vehicle 10E on the traffic flow in the parking lot 1. That is, it is possible to suppress the disturbance or stagnation of the traffic flow in the parking lot 1. As a result, the decrease in processing efficiency associated with the automated valet parking is suppressed.

When there is a first non-interfering route RN1 that interferes with neither the exiting route RX nor the peripheral vehicle route RS, the first non-interfering route RN1 is determined as the retreating route RE of the retreating vehicle 10E. As a result, it is possible to suppress the influence of the movement of the retreating vehicle 10E on the other AVP vehicles 10 and the traffic flow in the parking lot 1. As a result, the decrease in processing efficiency associated with the automated valet parking is suppressed.

The AVP vehicle 10 and the automated valet parking system 100 according to the present embodiment will be described below in more detail.

3. Configuration Example of AVP Vehicle

3-1. Configuration Example

Figure 17:
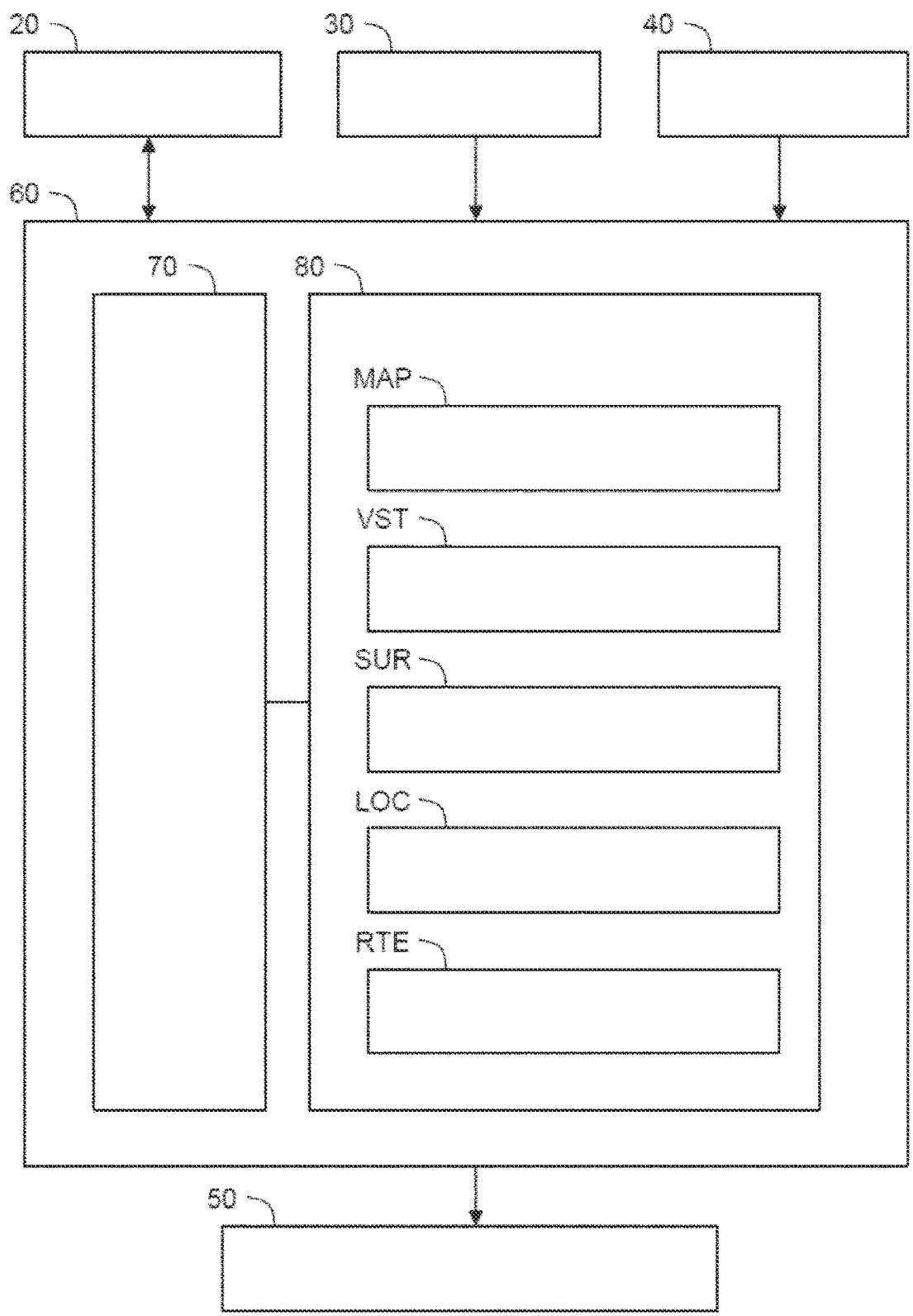
FIG. 17 is a block diagram illustrating a configuration example of the AVP vehicle according to the embodiment of the present disclosure.

FIG. 17 is a block diagram illustrating a configuration example of the AVP vehicle 10 according to the present embodiment. The AVP vehicle 10 includes a vehicle condition sensor 20, a recognition sensor 30, a communication device 40, a travel device 50, and a control device 60.

The vehicle condition sensor 20 detects conditions of the AVP vehicle 10. Examples of the vehicle condition sensor 20 include a vehicle speed sensor (wheel speed sensor), a steering angle sensor, a yaw rate sensor, and a lateral acceleration sensor.

The recognition sensor 30 recognizes (detects) a situation around the AVP vehicle 10. Examples of the recognition sensor 30 include a camera, a laser imaging, detection, and ranging (LIDAR) sensor, and a radar.

The communication device 40 communicates with the outside of the AVP vehicle 10. For example, the communication device 40 communicates with the automated valet parking system 100.

The travel device 50 includes a steering device, a driving device, and a braking device. The steering device steers wheels of the AVP vehicle 10. For example, the steering device includes an electric power steering (EPS) system. The driving device is a driving power source that generates a driving force. Examples of the driving device include an engine, an electric motor, and an in-wheel motor. The braking device generates a braking force.

The control device 60 controls the AVP vehicle 10. Specifically, the control device 60 includes one or more processors 70 (hereinafter referred to simply as "processor 70") and one or more storage devices 80 (hereinafter referred to simply as "storage device 80"). The processor 70 executes various processes. The storage device 80 stores various kinds of information. Examples of the storage device 80 include a volatile memory, a non-volatile memory, a hard disk drive (HDD), and a solid state drive (SSD). The control device 60 implements various processes by the processor 70 executing a control program that is a computer program. The control program is stored in the storage device 80 or recorded on a computer-readable recording medium.

3-2. Information Acquisition Process

The processor 70 (control device 60) executes an information acquisition process for acquiring various kinds of information. Various kinds of information include parking lot map information MAP, vehicle condition information VST, surrounding situation information SUR, and the like. The acquired information is stored in the storage device 80.

The parking lot map information MAP is the map information of the parking lot 1. Specifically, the parking lot map information MAP indicates arrangement of the boarding/alighting area 2, the passageway 3, the parking slots 4, the marks 5, and the like in the parking lot 1. The parking lot map information MAP is provided by the automated valet parking system 100. The processor 70 acquires the parking lot map information MAP from the automated valet parking system 100 via the communication device 40.

The vehicle condition information VST indicates conditions of the AVP vehicle 10, and indicates detection results from the vehicle condition sensor 20. Examples of the conditions of the AVP vehicle 10 include a vehicle speed (wheel speed), a steering angle (wheel steered angle), a yaw rate, and a lateral acceleration. The processor 70 acquires the vehicle condition information VST from the vehicle condition sensor 20.

The surrounding situation information SUR indicates a situation around the AVP vehicle 10, and indicates a recognition result from the recognition sensor 30. For example, the surrounding situation information SUR includes information on an image captured by a camera. As another example, the surrounding situation information SUR includes measurement information indicating a measurement result from the LIDAR sensor or the radar. Further, the surrounding situation information SUR includes object information related to objects around the AVP vehicle 10. Examples of the objects around the AVP vehicle 10 include the passageway 3, the parking slots 4, the marks 5, lane marking lines, and other vehicles. The object information includes relative positions and relative speeds of the objects to the AVP vehicle 10 (recognition sensor 30). Based on at least one of the image information and the measurement information, the processor 70 can recognize objects around the AVP vehicle 10 and calculate relative positions and relative speeds of the recognized objects. In this way, the processor 70 acquires the surrounding situation information SUR based on the recognition result from the recognition sensor 30.

3-3. Localization Process

The processor 70 (control device 60) performs a "localization process (self-position estimation process)" for estimating a vehicle position of the AVP vehicle 10 in the parking lot 1. In the localization process, the vehicle condition sensor 20 and the recognition sensor 30 are used. Specifically, the processor 70 calculates the amount of movement of the AVP vehicle 10 based on the vehicle condition information VST (vehicle speed, steering angle) obtained by the vehicle condition sensor 20, thereby roughly calculating the vehicle position. The processor 70 corrects the vehicle position by comparing an installation position of the mark 5 indicated by the parking lot map information MAP with a recognition position of the mark 5 indicated by the surrounding situation information SUR. As a result, the vehicle position can be estimated (determined) with high accuracy. By repeating the calculation of the movement amount and the correction of the vehicle position, a highly accurate vehicle position can be obtained continuously.

Localization information LOC indicates a vehicle position estimated by the localization process. As described above, the processor 70 acquires the localization information LOC by executing the localization process based on the parking lot map information MAP, the vehicle condition information VST, and the surrounding situation information SUR. The localization information LOC is stored in the storage device 80.

3-4. Communication Process

The processor 70 (control device 60) communicates with the automated valet parking system 100 via the communication device 40. For example, the processor 70 receives an entrance instruction, an exit instruction, and the like from the automated valet parking system 100. The processor 70 periodically transmits the vehicle condition information VST, the localization information LOC, and the like to the automated valet parking system 100.

3-5. Vehicle Travel Control

The processor 70 (control device 60) executes the "vehicle travel control" for controlling the traveling of the AVP vehicle 10 without a driving operation of the driver. The vehicle travel control includes steering control, acceleration control, and braking control. The processor 70 executes the vehicle travel control by controlling the travel device 50. Specifically, the processor 70 executes the steering control by controlling the steering device. The processor 70 also executes the acceleration control by controlling the driving device. The processor 70 also executes the braking control by controlling the braking device.

In the parking lot 1, the processor 70 executes the vehicle travel control in order to cause the AVP vehicle 10 to travel autonomously. Specifically, the processor 70 grasps a map of the parking lot 1 and a vehicle position in the parking lot 1 based on the parking lot map information MAP and the localization information LOC. Then, the processor 70 executes the vehicle travel control such that the AVP vehicle 10 autonomously travels toward a destination.

In the case of the entrance process, the departure place is the boarding/alighting area 2 and the destination is an allocated parking slot 4. In the case of the exit process, the departure place is the allocated parking slot 4 (parking slot 4X) and the destination is the boarding/alighting area 2. In the case of the retreating vehicle 10E, the departure place is the parking slot 4E and the destination is the original parking slot 4E (see FIG. 10) or another available parking slot 4A (see FIG. 11). The positions of the boarding/alighting area 2 and the parking slots 4 are obtained from the parking lot map information MAP.

Traveling route information RTE indicates a traveling route of the AVP vehicle 10 in the parking lot 1. The traveling route is determined by at least a vehicle position and a traveling direction of the AVP vehicle 10. The vehicle position of the AVP vehicle 10 on the traveling route may be given as a function of time. That is, the traveling route may geometrically indicate only a passing position of the AVP vehicle 10, or may indicate a position of the AVP vehicle 10 at a specific timing.

For example, the traveling route information RTE is generated by the automated valet parking system 100 and provided to each AVP vehicle 10. The exiting vehicle 10X is provided with traveling route information RTE indicating the exiting route RX. The retreating vehicle 10E is provided with traveling route information RTE indicating the retreating route RE. The peripheral vehicle 10S is provided with traveling route information RTE indicating the peripheral vehicle route RS (entering route or exiting route). The processor 70 of each AVP vehicle 10 acquires the traveling route information RTE from the automated valet parking system 100 via the communication device 40. The traveling route information RTE is stored in the storage device 80.

As another example, the traveling route information RTE may be generated by the processor 70 of the AVP vehicle 10. In that case, the processor 70 communicates with the automated valet parking system 100 via the communication device 40, and acquires information necessary to determine the traveling route. Then, the processor 70 determines the traveling route based on the acquired information and generates the traveling route information RTE. The traveling route information RTE is stored in the storage device 80.

The processor 70 executes the vehicle travel control based on the parking lot map information MAP, the localization information LOC, and the traveling route information RTE so that the AVP vehicle 10 travels along the traveling route. The processor 70 may execute the vehicle travel control to avoid a collision with another vehicle by referring to the surrounding situation information SUR.

4. Configuration Example of Automated Valet Parking System

Figure 18:
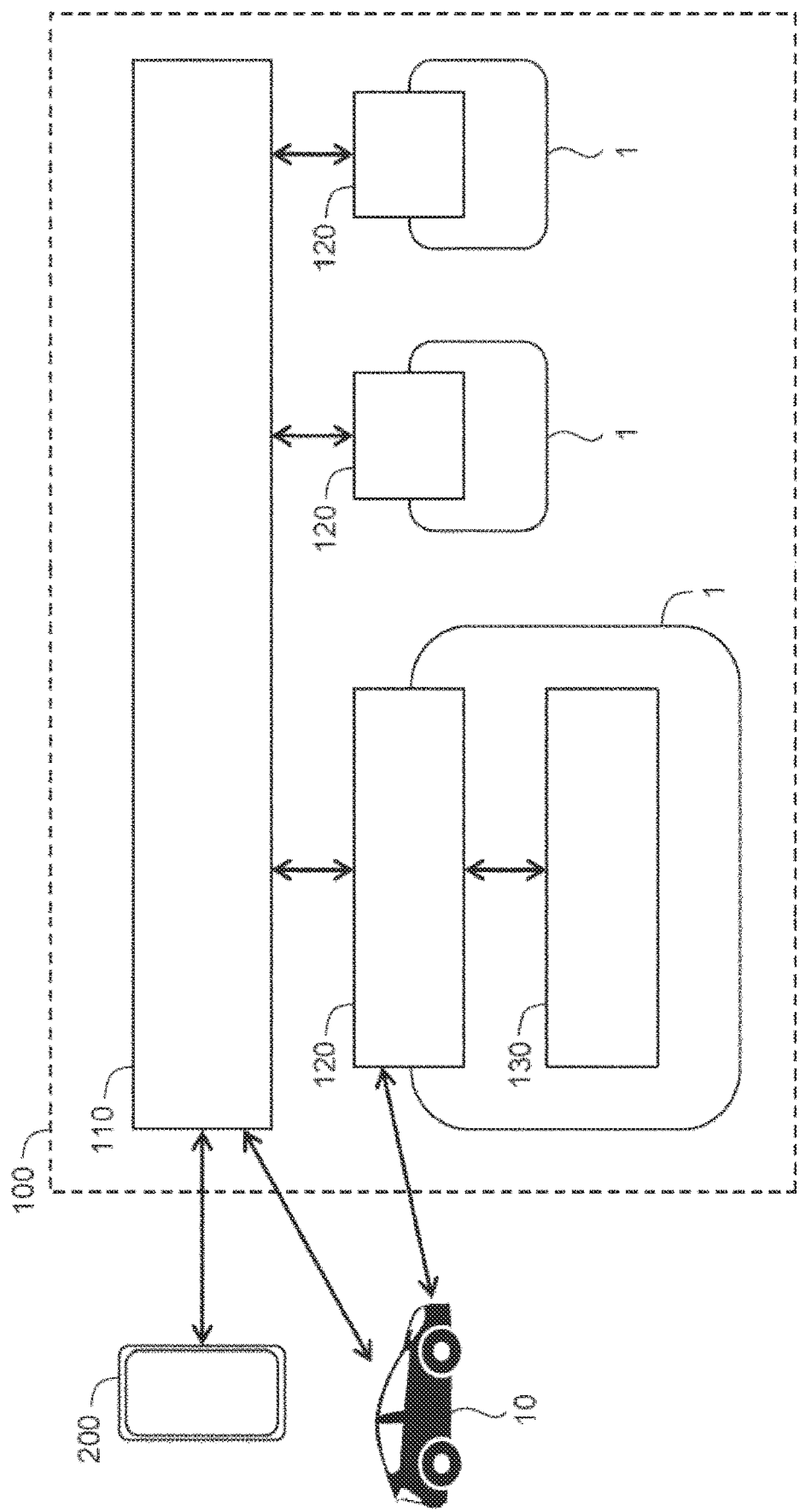
FIG. 18 is a schematic diagram illustrating a configuration example of the automated valet parking system according to the embodiment of the present disclosure.

FIG. 18 is a schematic diagram illustrating a configuration example of the automated valet parking system 100 according to the present embodiment. The automated valet parking system 100 includes a vehicle management center 110, a control center 120, and an infrastructure sensor 130. The control center 120 is provided for each parking lot 1. Therefore, there are the same number of control centers 120 as the parking lots 1. The vehicle management center 110 controls all the control centers 120. The infrastructure sensor 130 is installed in the parking lot 1 and recognizes a situation in the parking lot 1. For example, the infrastructure sensor 130 includes an infrastructure camera that captures an image of a situation in the parking lot 1.

Figure 19:
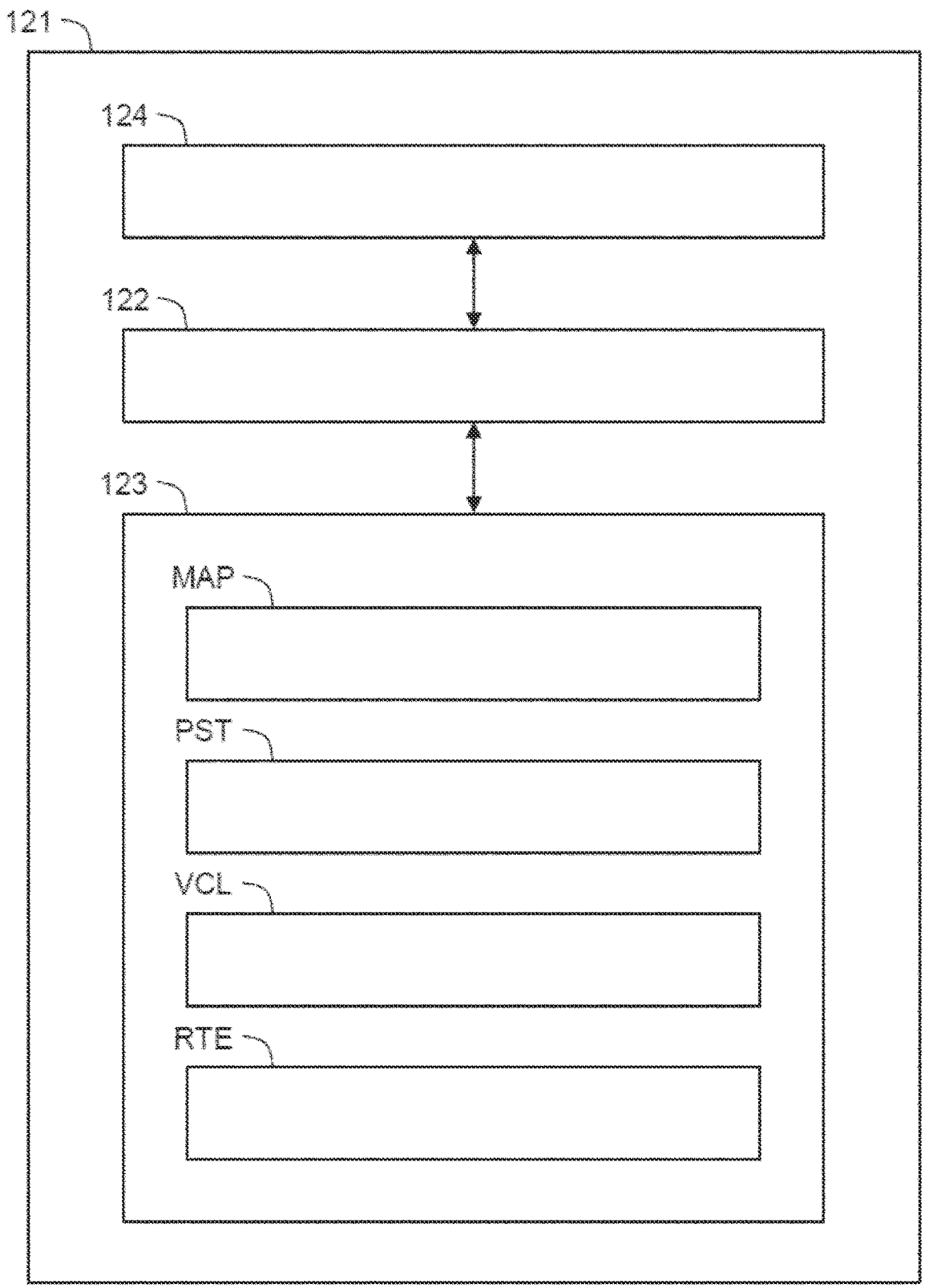
FIG. 19 is a block diagram illustrating a configuration example of a control center according to the embodiment of the present disclosure.

FIG. 19 is a block diagram illustrating a configuration example of the control center 120 according to the present embodiment. The control center 120 includes an information processing device 121 (controller). The information processing device 121 manages the AVP vehicles 10 in the parking lot 1 and also controls the AVP vehicles 10 in the parking lot 1.

The information processing device 121 includes one or more processors 122 (hereinafter referred to simply as "processor 122") and one or more storage devices 123 (hereinafter referred to simply as "storage device 123"). The processor 122 executes various processes. The storage device 123 stores various kinds of information. Examples of the storage device 123 include a volatile memory, a non-volatile memory, an HDD, and an SSD. The information processing device 121 implements various processes by the processor 122 executing a control program that is a computer program. The control program is stored in the storage device 123 or recorded on a computer-readable recording medium.

The information processing device 121 further includes a communication device 124. The communication device 124 communicates with the vehicle management center 110, the AVP vehicles 10, and the infrastructure sensor 130 via a communication network.

The parking lot map information MAP is created in advance and stored in the storage device 123 of the control center 120. The processor 122 communicates with the AVP vehicle 10 via the communication device 124, and provides the parking lot map information MAP to the AVP vehicle 10.

Parking status information PST indicates usage (availability) of each parking slot 4 of the parking lot 1. The parking status information PST is stored in the storage device 123. The processor 122 manages the usage of each parking slot 4, and updates the parking status information PST every time the entrance process or the exit process is performed.

Vehicle information VCL is related to each AVP vehicle 10 in the parking lot 1. For example, the vehicle information VCL indicates the vehicle position of each AVP vehicle 10 in the parking lot 1. The processor 122 communicates with each AVP vehicle 10 via the communication device 124, and acquires the localization information LOC from each AVP vehicle 10. The localization information LOC indicates a current vehicle position of each AVP vehicle 10. Regarding the AVP vehicle 10 parked in the parking slot 4, the vehicle information VCL may indicate the parking slot 4 as the vehicle position. The vehicle information VCL may include the vehicle condition information VST transmitted from each AVP vehicle 10. The vehicle information VCL is stored in the storage device 123.

In the entrance process, the processor 122 allocates an available parking slot 4 to the AVP vehicle 10 scheduled to enter the parking lot 1 based on the parking status information PST. The processor 122 determines a traveling route from the boarding/alighting area 2 to the allocated parking slot 4, that is, an entering route based on the parking lot map information MAP. The traveling route information RTE indicates the determined entering route. The processor 122 communicates with the AVP vehicle 10 via the communication device 124, and transmits an entrance instruction to the AVP vehicle 10. The entrance instruction includes the parking lot map information MAP and the traveling route information RTE indicating the entering route, and is an instruction to move along the entering route. After the entrance process, the processor 122 changes the status of the allocated parking slot 4 to "in use" and updates the parking status information PST.

In the exit process, the processor 122 determines a traveling route from the parking slot 4X to the boarding/alighting area 2, that is, the exiting route RX based on the parking lot map information MAP. The traveling route information RTE indicates the determined exiting route RX. The processor 122 communicates with the exiting vehicle 10X via the communication device 124, and transmits an exit instruction to the exiting vehicle 10X. The exit instruction includes the parking lot map information MAP and the traveling route information RTE indicating the exiting route RX, and is an instruction to move along the exiting route RX. After the exit process, the processor 122 changes the status of the parking slot 4X to "available" and updates the parking status information PST.

The determination of the retreating route RE of the retreating vehicle 10E will be described later.

The peripheral vehicle 10S is an AVP vehicle 10 traveling in the parking lot 1, that is, an AVP vehicle 10 entering or exiting the parking lot 1. The peripheral vehicle route RS is the entering route or the exiting route RX.

The traveling route information RTE stored in the storage device 123 of the control center 120 is a set of pieces of traveling route information RTE related to the AVP vehicles 10 in the parking lot 1. That is, the traveling route information RTE indicates the exiting route RX of the exiting vehicle 10X, the peripheral vehicle route RS of the peripheral vehicle 10S, and the retreating route RE of the retreating vehicle 10E.

5. Processing Flow of Vehicle Control Process During Exit

5-1. Overall Flow

Figure 20:
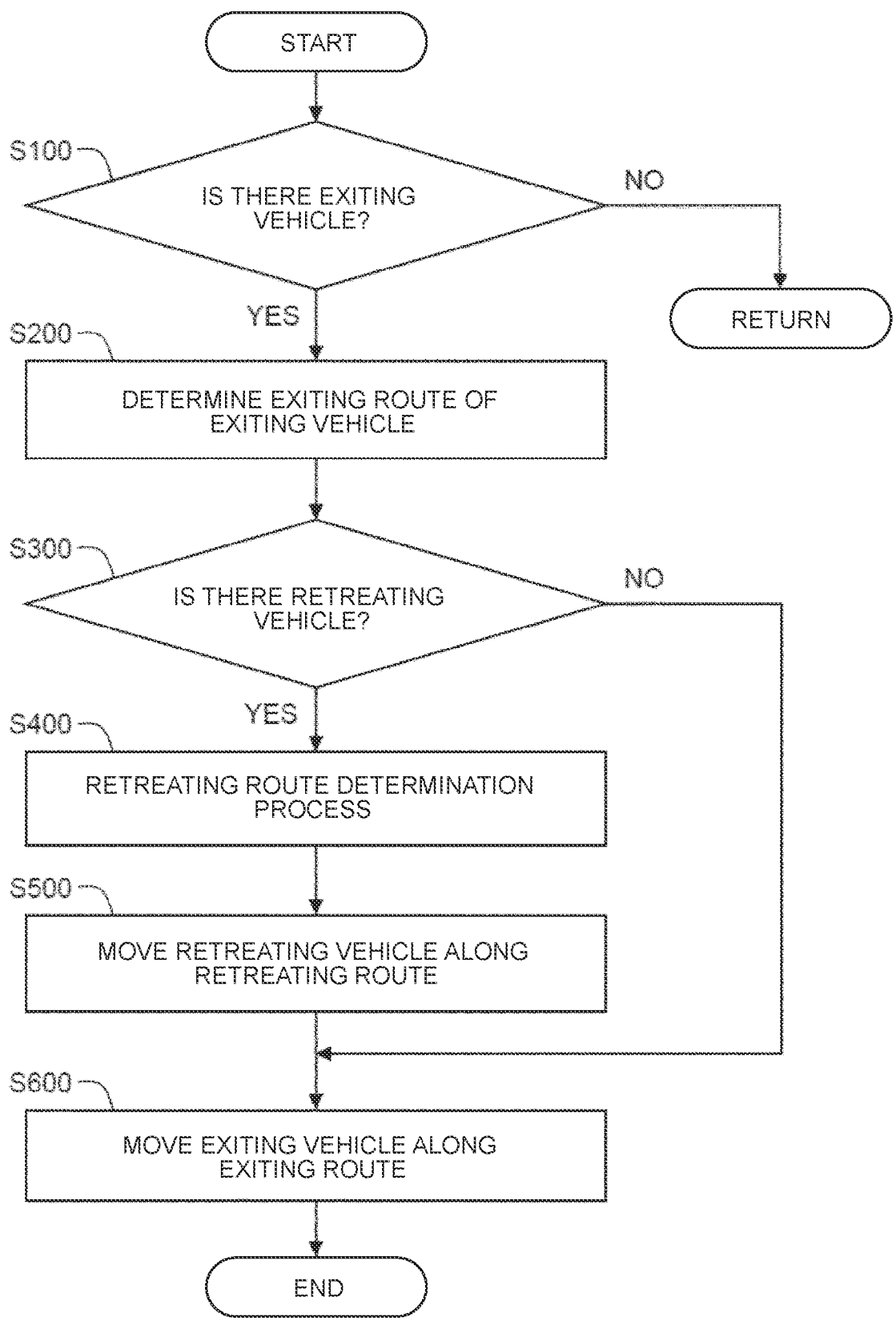
FIG. 20 is a flowchart illustrating a vehicle control process during exit according to the embodiment of the present disclosure.

FIG. 20 is a flowchart illustrating the vehicle control process during exit according to the present embodiment.

In Step S100, the processor 122 of the control center 120 determines whether the exiting vehicle 10X is present. For example, the exiting vehicle 10X appears in response to an exit request from a user. The exit request is transmitted from the user's terminal device 200 to the vehicle management center 110. The exit request is further transmitted from the vehicle management center 110 to the control center 120. As another example, the exiting vehicle 10X automatically appears before a scheduled exit time specified in advance by the user. When the exiting vehicle 10X is not present (Step S100; NO), the process in this cycle is terminated. When the exiting vehicle 10X is present (Step S100; YES), the process proceeds to Step S200.

In Step S200, the processor 122 of the control center 120 determines the exiting route RX of the exiting vehicle 10X. The exiting route RX is a traveling route from the parking slot 4X to the boarding/alighting area 2. The processor 122 can determine the exiting route RX based on the parking lot map information MAP. At this stage, the peripheral vehicle route RS of the peripheral vehicle 10S traveling in the parking lot 1 has already been determined. The processor 122 may determine the exiting route RX by referring to the traveling route information RTE so that the exiting route RX does not interfere with the peripheral vehicle route RS. The traveling route information RTE indicating the determined exiting route RX is stored in the storage device 123. When the exiting route RX of the exiting vehicle 10X is determined, the process proceeds to Step S300.

In Step S300, the processor 122 of the control center 120 determines whether the retreating vehicle 10E is present. The retreating vehicle 10E is an AVP vehicle 10 parked in the parking slot 4E that is in front of the exiting vehicle 10X to hinder the movement of the exiting vehicle 10X. The arrangement of the parking slots 4 is obtained from the parking lot map information MAP. The vehicle position of each AVP vehicle 10 in the parking lot 1 is obtained from the vehicle information VCL. The processor 122 acquires the parking lot map information MAP and the vehicle information VCL from the storage device 123. The processor 122 determines whether the retreating vehicle 10E is present based on the parking lot map information MAP and the vehicle information VCL. When the retreating vehicle 10E is not present (Step S300; NO), the process proceeds to Step S600. When the retreating vehicle 10E is present (Step S300; YES), the process proceeds to Step S400.

In Step S400, the processor 122 of the control center 120 executes the "retreating route determination process" for determining the retreating route RE of the retreating vehicle 10E. The processor 122 searches for a non-interfering route RN that does not interfere with at least the exiting route RX of the exiting vehicle 10X. Then, the processor 122 determines the non-interfering route RN as the retreating route RE. Various examples of this retreating route determination process will be described later. When the retreating route determination process is completed, the process proceeds to Step S500.

In Step S500, the processor 122 of the control center 120 moves the retreating vehicle 10E along the retreating route RE. Specifically, the processor 122 communicates with the retreating vehicle 10E via the communication device 124, and transmits a retreat instruction to the retreating vehicle 10E. The retreat instruction includes the parking lot map information MAP and the traveling route information RTE indicating the retreating route RE, and is an instruction to move along the retreating route RE. The processor 70 of the retreating vehicle 10E receives the retreat instruction from the control center 120 via the communication device 40. In response to the retreat instruction, the processor 70 of the retreating vehicle 10E executes the vehicle travel control. Specifically, the processor 70 executes the vehicle travel control based on the parking lot map information MAP, the localization information LOC, and the traveling route information RTE so that the retreating vehicle 10E travels along the retreating route RE. When the retreating vehicle is moved, the process proceeds to Step S600.

In Step S600, the processor 122 of the control center 120 moves the exiting vehicle 10X along the exiting route RX. Specifically, the processor 122 communicates with the exiting vehicle 10X via the communication device 124, and transmits an exit instruction to the exiting vehicle 10X. The exit instruction includes the parking lot map information MAP and the traveling route information RTE indicating the exiting route RX, and is an instruction to move along the exiting route RX. The processor 70 of the exiting vehicle 10X receives the exit instruction from the control center 120 via the communication device 40. In response to the exit instruction, the processor 70 of the exiting vehicle 10X executes the vehicle travel control. Specifically, the processor 70 executes the vehicle travel control based on the parking lot map information MAP, the localization information LOC, and the traveling route information RTE so that the exiting vehicle 10X travels along the exiting route RX.

5-2. Retreating Route Determination Process (Step S400)

Figure 21:
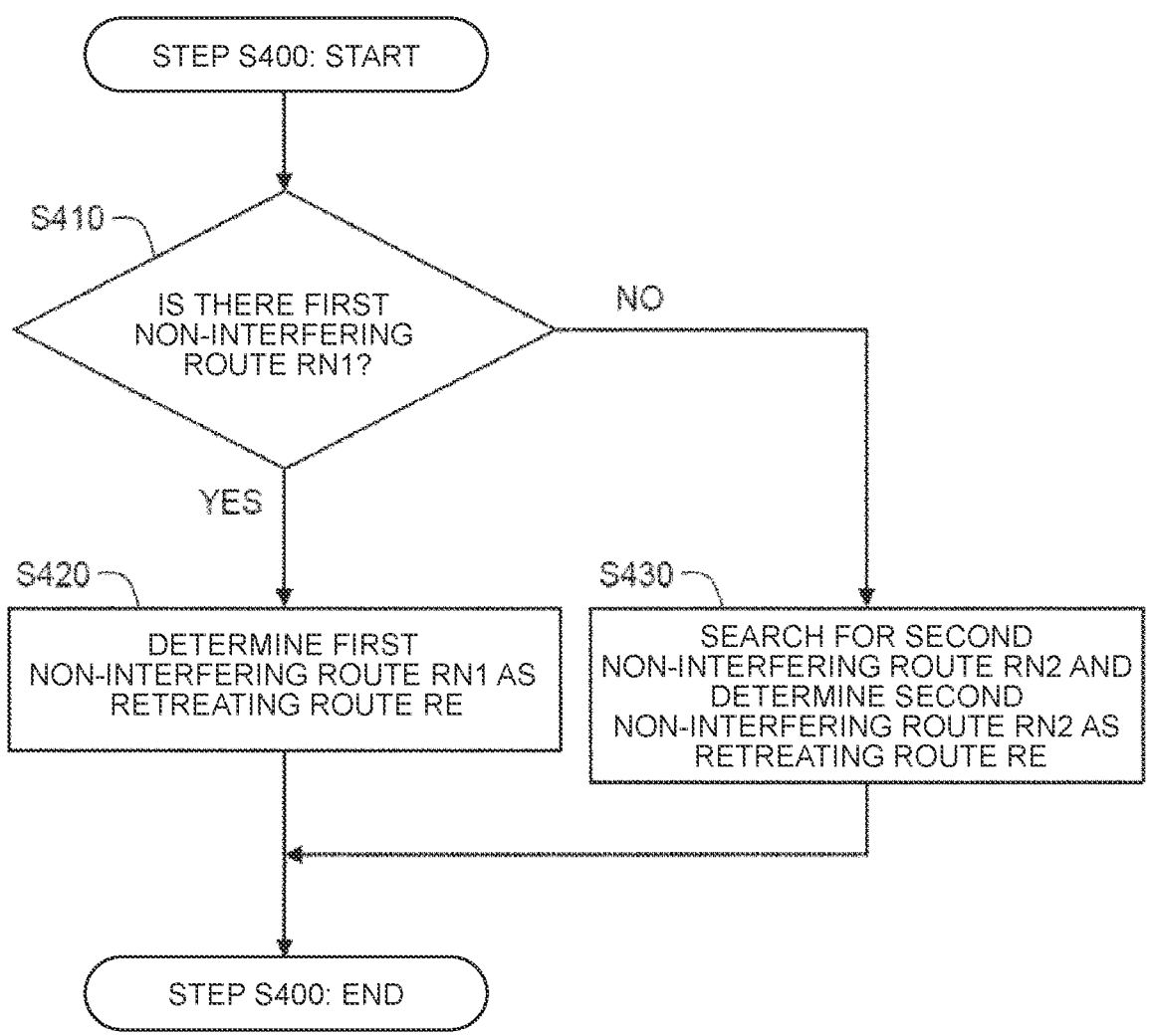
FIG. 21 is a flowchart illustrating a retreating route determination process (Step S400) according to the embodiment of the present disclosure.

FIG. 21 is a flowchart illustrating the retreating route determination process (Step S400).

In Step S410, the processor 122 of the control center 120 searches for the first non-interfering route RN1. In other words, the processor 122 determines whether the first non-interfering route RN1 is present. The first non-interfering route RN1 is a retreating route RE that interferes with neither the exiting route RX of the exiting vehicle 10X nor the peripheral vehicle route RS of the peripheral vehicle 10S (see FIGS. 12 to 14).

More specifically, the processor 122 acquires the parking lot map information MAP, the traveling route information RTE, and the vehicle information VCL from the storage device 123. The traveling route information RTE indicates the exiting route RX of the exiting vehicle 10X and the peripheral vehicle route RS of the peripheral vehicle 10S. The current position of the peripheral vehicle 10S is obtained from the vehicle information VCL. The processor 122 searches for the first non-interfering route RN1 based on the parking lot map information MAP, the traveling route information RTE, and the vehicle information VCL. When the available parking slot 4A is necessary, the parking status information PST is also used.

When the first non-interfering route RN1 is found, that is, when the first non-interfering route RN1 is present (Step S410; YES), the process proceeds to Step S420. In Step S420, the processor 122 determines the first non-interfering route RN1 as the retreating route RE of the retreating vehicle 10E.

When the first non-interfering route RN1 is not found, that is, when the first non-interfering route RN1 is not present (Step S410; NO), the process proceeds to Step S430. In Step S430, the processor 122 searches for the second non-interfering route RN2 that does not interfere with the exiting route RX based on the parking lot map information MAP and the exiting route RX (see FIGS. 15 and 16). When the available parking slot 4A is necessary, the parking status information PST is also used. The processor 122 determines the second non-interfering route RN2 as the retreating route RE of the retreating vehicle 10E.

Step S400 is performed for each of one or more retreating vehicles 10E. When a plurality of retreating vehicles 10E is present, the retreating routes RE of some retreating vehicles 10E may be the first non-interfering routes RN1, and the retreating routes RE of the other retreating vehicles 10E may be the second non-interfering routes RN2.

Various examples of Step S410 will be described below.

5-2-1. First Example

Figure 22:
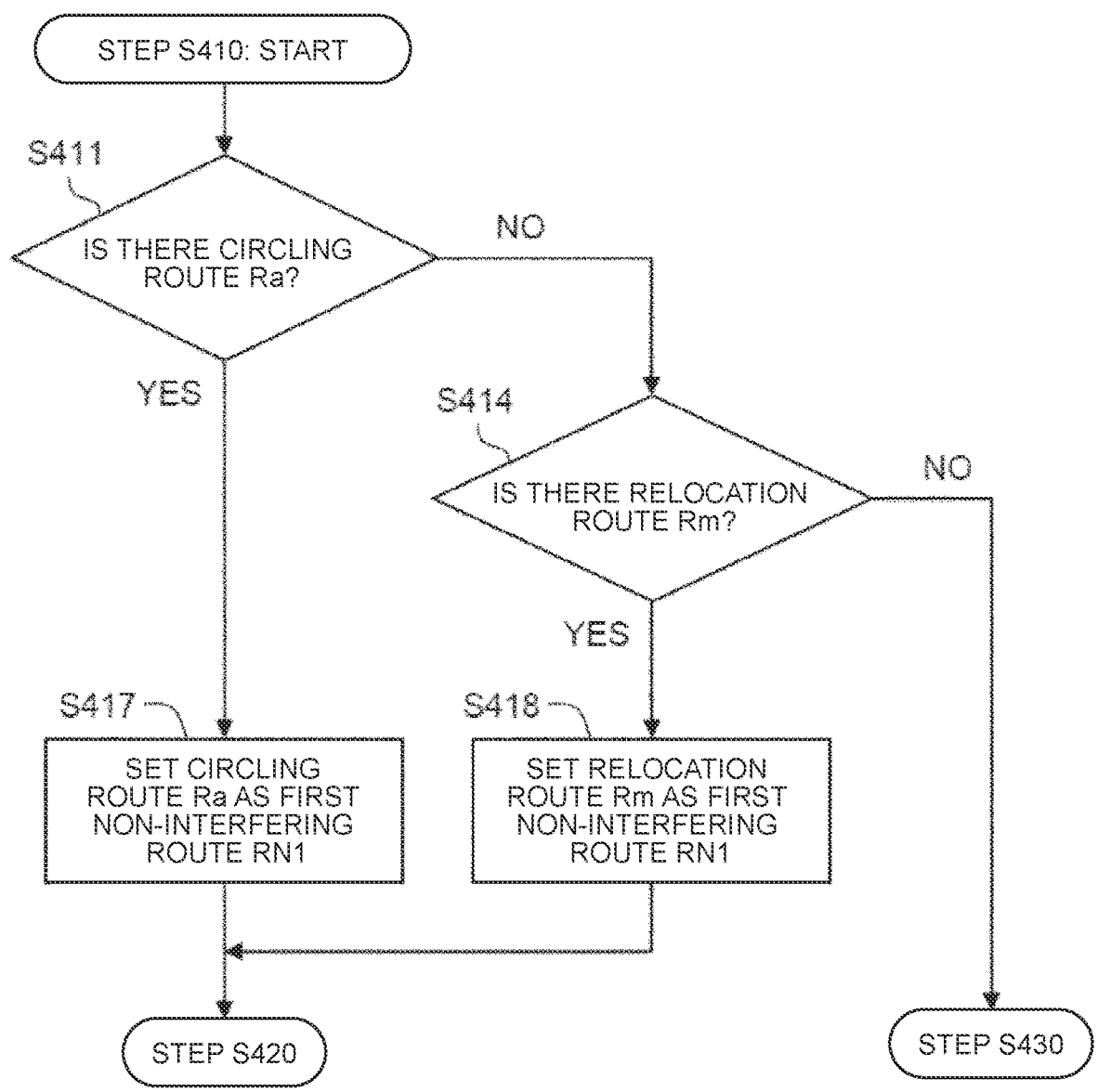
FIG. 22 is a flowchart illustrating a first example of Step S410 according to the embodiment of the present disclosure.

FIG. 22 is a flowchart illustrating a first example of Step S410. As described above, the two types of retreating route RE that are the circling route Ra (see FIG. 10) and the relocation route Rm (FIG. 11) are conceivable. In the first example, a search is made for the circling route Ra with priority.

In Step S411, the processor 122 first searches for the circling route Ra as the first non-interfering route RN1. The circling route Ra is a first non-interfering route RN1 in which the retreating vehicle 10E moves from the original parking slot 4E and then returns to the original parking slot 4E without traveling in backward (see FIG. 10). The processor 122 searches for the circling route Ra serving as the first non-interfering route RN1 based on the parking lot map information MAP, the traveling route information RTE, and the vehicle information VCL. When the circling route Ra is found (Step S411; YES), the process proceeds to Step S417. In other cases (Step S411; NO), the process proceeds to Step S414.

In Step S414, the processor 122 searches for the relocation route Rm as the first non-interfering route RN1. The relocation route Rm is a first non-interfering route RN1 in which the retreating vehicle 10E moves (relocates) from the original parking slot 4E to another available parking slot 4A (see FIG. 11). The available parking slot 4A is obtained from the parking status information PST. The processor 122 searches for the relocation route Rm serving as the first non-interfering route RN1 based on the parking lot map information MAP, the traveling route information RTE, the vehicle information VCL, and the parking status information PST. When the relocation route Rm is found (Step S414; YES), the process proceeds to Step S418. In other cases (Step S414; NO), the process proceeds to Step S430.

In Step S417, the processor 122 sets the circling route Ra as the first non-interfering route RN1.

In Step S418, the processor 122 sets the relocation route Rm as the first non-interfering route RN1. The processor 122 changes the parking slot 4 allocated to the retreating vehicle 10E to the parking slot 4A, and updates the parking status information PST.

Step S410 is performed for each of one or more retreating vehicles 10E. When a plurality of retreating vehicles 10E is present, the retreating routes RE of some retreating vehicles 10E may be set as the circling routes Ra, and the retreating routes RE of the other retreating vehicles 10E may be set as the relocation routes Rm.

According to the first example described above, a search is made for the circling route Ra with priority. When the circling route Ra is adopted as the retreating route RE, there is no need to change the allocation of the parking slot 4 to the retreating vehicle 10E and to update the parking status information PST. This is useful from the viewpoint of management of the parking slots 4.

5-2-2. Second Example

Figure 23:
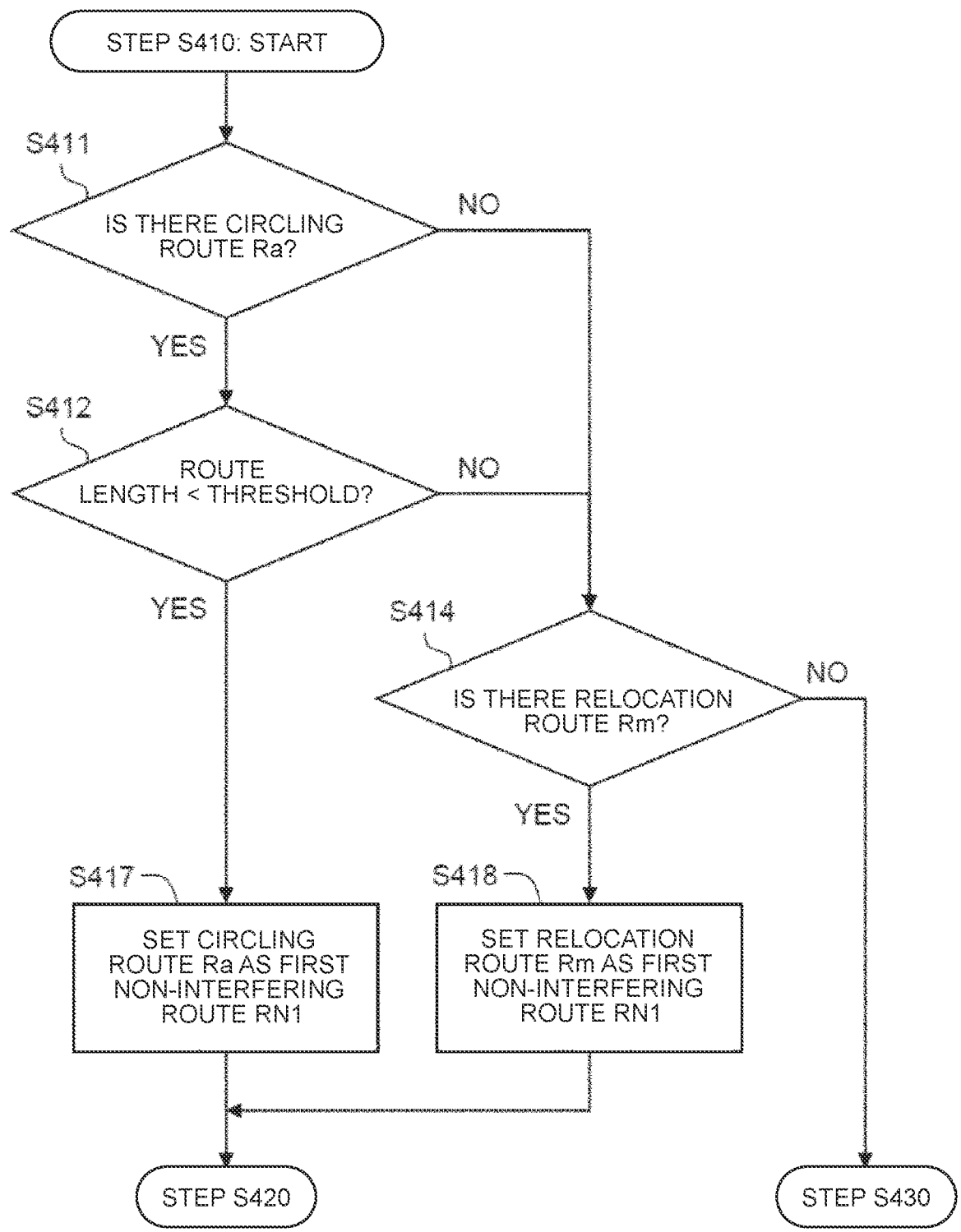
FIG. 23 is a flowchart illustrating a second example of Step S410 according to the embodiment of the present disclosure.

FIG. 23 is a flowchart illustrating a second example of Step S410. The second example is a modification of the first example. Description overlapping that of the first example will be omitted as appropriate. When the circling route Ra is found in Step S411 (Step S411; YES), the process proceeds to Step S412.

In Step S412, the processor 122 determines whether the length of the circling route Ra is less than a predetermined threshold. The length of the circling route Ra can be calculated based on the parking lot map information MAP. When the length of the circling route Ra is less than the predetermined threshold (Step S412; YES), the process proceeds to Step S417. When the length of the circling route Ra is equal to or more than the predetermined threshold (Step S412; NO), the process proceeds to Step S414.

According to the second example, selection of an excessively long circling route Ra is avoided. This eliminates the need to move the retreating vehicle 10E over a long distance in the parking lot 1. This is useful from the viewpoint of reduction in energy consumption of the retreating vehicle 10E.

5-2-3. Third Example

Figure 24:
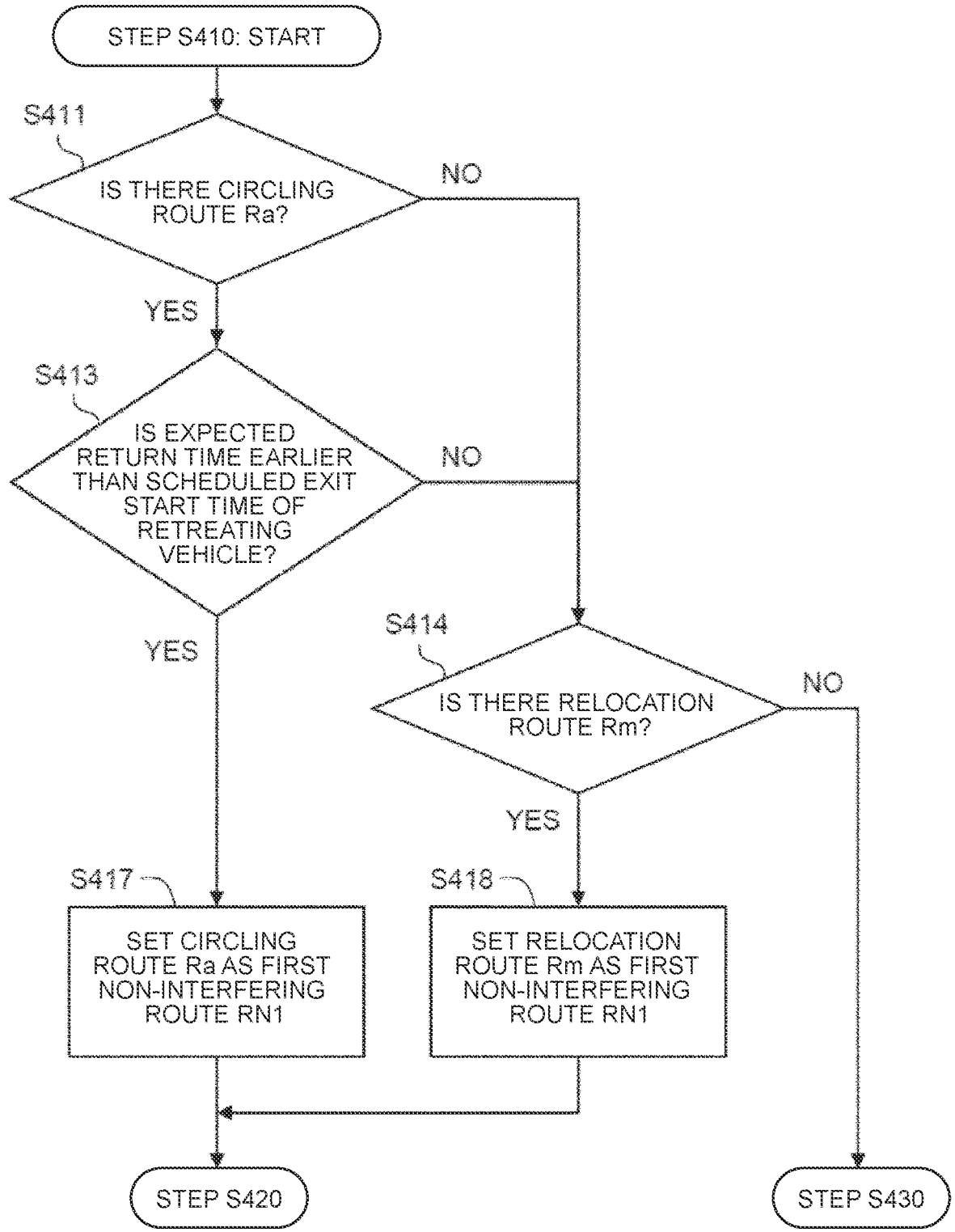
FIG. 24 is a flowchart illustrating a third example of Step S410 according to the embodiment of the present disclosure.

FIG. 24 is a flowchart illustrating a third example of Step S410. The third example is a modification of the first example. Description overlapping that of the first example will be omitted as appropriate. When the circling route Ra is found in Step S411 (Step S411; YES), the process proceeds to Step S413.

In Step S413, the processor 122 calculates an expected return time when the retreating vehicle 10E is expected to travel along the circling route Ra and return to the original parking slot 4E. For example, the vehicle speed in the parking lot 1 is set to a constant speed. The length of the circling route Ra can be calculated based on the parking lot map information MAP. Therefore, the processor 122 can calculate the expected return time based on the constant speed and the length of the circling route Ra.

The processor 122 determines whether the expected return time is earlier than a scheduled exit start time of the retreating vehicle 10E. In other words, the processor 122 determines whether the expected return time has a margin before the exit of the retreating vehicle 10E. The scheduled exit start time of the retreating vehicle 10E is managed by the vehicle management center 110 or the control center 120. When the scheduled exit start time of the retreating vehicle 10E is managed by the vehicle management center 110, the processor 122 acquires information on the scheduled exit start time of the retreating vehicle 10E from the vehicle management center 110 via the communication device 124. When the expected return time of the retreating vehicle 10E is earlier than the scheduled exit start time (Step S413; YES), the process proceeds to Step S417. When the expected return time of the retreating vehicle 10E is later than the scheduled exit start time (Step S413; NO), the process proceeds to Step S414.

According to the third example, a delay in the exit of the retreating vehicle 10E due to the circling route Ra is suppressed.

5-2-4. Fourth Example

Figure 25:
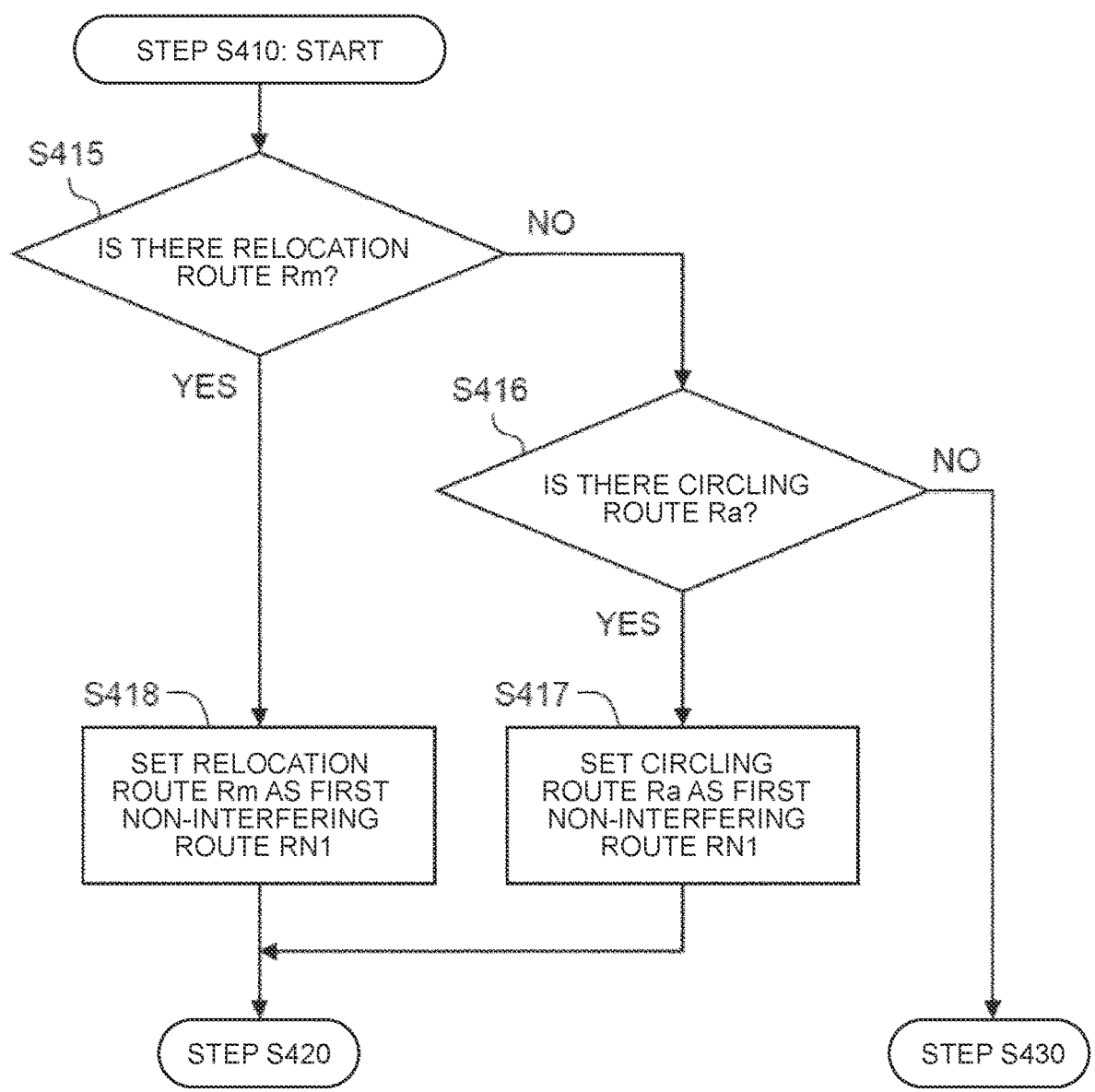
FIG. 25 is a flowchart illustrating a fourth example of Step S410 according to the embodiment of the present disclosure.

FIG. 25 is a flowchart illustrating a fourth example of Step S410. In the fourth example, a search is made for the relocation route Rm with priority.

In Step S415, the processor 122 first searches for the relocation route Rm as the first non-interfering route RN1. Step S415 is performed similarly to Step S414. When the relocation route Rm is found (Step S415; YES), the process proceeds to Step S418. In other cases (Step S415; NO), the process proceeds to Step S416.

In Step S416, the processor 122 searches for the circling route Ra as the first non-interfering route RN1. Step S416 is performed similarly to Step S411. When the circling route Ra is found (Step S416; YES), the process proceeds to Step S417. In other cases (Step S416; NO), the process proceeds to Step S430.

According to the fourth example described above, a search is made for the relocation route Rm with priority. When the relocation route Rm is adopted as the retreating route RE, the moving distance of the retreating vehicle 10E is relatively short. This is useful from the viewpoint of reduction in energy consumption of the retreating vehicle 10E.

5-3. Modifications

The traveling route in the parking lot 1 may be determined by the AVP vehicle 10. For example, the exiting route RX may be determined by the exiting vehicle 10X (Step S200). As another example, the retreating route RE may be determined by the retreating vehicle 10E (Step S400). The processor 70 of the AVP vehicle 10 communicates with the control center 120 via the communication device 40, and acquires information necessary to determine the traveling route. Then, the processor 70 determines the traveling route based on the acquired information and generates the traveling route information RTE.

6. Vehicle Control System

The control device 60 of the AVP vehicle 10 (see FIG. 17) and the information processing device 121 of the control center 120 (see FIG. 19) constitute a "vehicle control system" that controls the AVP vehicle 10. The vehicle control system includes one or more processors (70, 122) and one or more storage devices (80, 123). The one or more processors perform the processes illustrated in FIGS. 20 to 25. The one or more storage devices store various kinds of information necessary for the processes to be performed by the one or more processors.

What is claimed is:

1. A vehicle control method for controlling vehicles adapted to automated valet parking in a parking lot, the vehicle control method comprising:
   acquiring map information of the parking lot and vehicle information indicating positions of the vehicles in the parking lot;
   determining whether a retreating vehicle is present based on the map information and the vehicle information, the retreating vehicle being a vehicle that needs to move from a parking slot where the retreating vehicle is parked to move an exiting vehicle scheduled to exit the parking lot;
   determining a retreating route through a retreating route determination process, the retreating route being a traveling route of the retreating vehicle when the retreating vehicle is moved to move the exiting vehicle, the retreating route determination process including
      acquiring traveling route information indicating an exiting route that is a traveling route of the exiting vehicle,
      searching, through a non-interfering route search process, for a non-interfering route that does not interfere with the exiting route based on the map information, the vehicle information, and the traveling route information, and
      determining the non-interfering route as the retreating route; and
   moving the retreating vehicle along the retreating route.

2. The vehicle control method according to claim 1, wherein non-interference between the non-interfering route and the exiting route includes at least one of the following conditions:
   a traveling direction of the retreating vehicle and a traveling direction of the exiting vehicle coincide with each other at a position where the non-interfering route and the exiting route overlap each other;
   the non-interfering route and the exiting route do not intersect each other on a passageway except a vicinity of the parking slot where the retreating vehicle is parked; and
   the retreating vehicle moving along the non-interfering route and the exiting vehicle moving along the exiting route are separated by a predetermined distance or more at any time.

3. The vehicle control method according to claim 1, wherein:
   the traveling route information further indicates a peripheral vehicle route that is a traveling route of a peripheral vehicle traveling in the parking lot; and
   the retreating route determination process includes
      searching for a first non-interfering route based on the map information, the vehicle information, and the traveling route information, the first non-interfering route being the non-interfering route that interferes with neither the exiting route nor the peripheral vehicle route, and
      determining the first non-interfering route as the retreating route when the first non-interfering route is found.

4. The vehicle control method according to claim 3, wherein non-interference between the non-interfering route and the peripheral vehicle route includes at least one of the following conditions:
   a traveling direction of the retreating vehicle and a traveling direction of the peripheral vehicle coincide with each other at a position where the non-interfering route and the peripheral vehicle route overlap each other;

the non-interfering route and the peripheral vehicle route do not intersect each other; and the retreating vehicle moving along the non-interfering route and the peripheral vehicle moving along the peripheral vehicle route are separated by a predetermined distance or more at any time.

5. The vehicle control method according to claim 3, wherein the retreating route determination process includes determining a second non-interfering route as the retreating route when the first non-interfering route is not found, the second non-interfering route being the non-interfering route that does not interfere with the exiting route.

6. The vehicle control method according to claim 1, wherein the non-interfering route is a circling route in which the retreating vehicle moves from an original parking slot and then returns to the original parking slot.

7. The vehicle control method according to claim 1, wherein the non-interfering route is a relocation route in which the retreating vehicle moves from an original parking slot to another available parking slot.

8. The vehicle control method according to claim 1, wherein the non-interfering route search process includes:
searching for a circling route, the circling route being the non-interfering route in which the retreating vehicle moves from an original parking slot and then returns to the original parking slot;
setting the circling route as the non-interfering route when the circling route is found;
searching for a relocation route based on parking status information indicating usage of each parking slot in the parking lot when the circling route is not found, the relocation route being the non-interfering route in which the retreating vehicle moves from the original parking slot to another available parking slot; and
setting the relocation route as the non-interfering route when the relocation route is found.

9. The vehicle control method according to claim 1, wherein the non-interfering route search process includes:
searching for a circling route, the circling route being the non-interfering route in which the retreating vehicle moves from an original parking slot and then returns to the original parking slot;
determining whether a length of the circling route is less than a threshold when the circling route is found;
setting the circling route as the non-interfering route when the length of the circling route is less than the threshold;
searching, when the circling route is not found or when the length of the circling route is equal to or more than the threshold, for a relocation route based on parking status information indicating usage of each parking slot in the parking lot, the relocation route being the non-interfering route in which the retreating vehicle moves from the original parking slot to another available parking slot; and
setting the relocation route as the non-interfering route when the relocation route is found.

10. The vehicle control method according to claim 1, wherein the non-interfering route search process includes:
searching for a circling route, the circling route being the non-interfering route in which the retreating vehicle moves from an original parking slot and then returns to the original parking slot;
determining whether an expected return time is earlier than a scheduled exit start time of the retreating vehicle when the circling route is found, the expected return time being a time when the retreating vehicle is expected to return to the original parking slot;
setting the circling route as the non-interfering route when the expected return time is earlier than the scheduled exit start time;
searching, when the circling route is not found or when the expected return time is later than the scheduled exit start time, for a relocation route based on parking status information indicating usage of each parking slot in the parking lot, the relocation route being the non-interfering route in which the retreating vehicle moves from the original parking slot to another available parking slot; and
setting the relocation route as the non-interfering route when the relocation route is found.

11. The vehicle control method according to claim 1, wherein the non-interfering route search process includes:
searching for a relocation route based on parking status information indicating usage of each parking slot in the parking lot, the relocation route being the non-interfering route in which the retreating vehicle moves from an original parking slot to another available parking slot;
setting the relocation route as the non-interfering route when the relocation route is found;
searching for a circling route when the relocation route is not found, the circling route being the non-interfering route in which the retreating vehicle moves from the original parking slot and then returns to the original parking slot; and
setting the circling route as the non-interfering route when the circling route is found.

12. The vehicle control method according to claim 1, further comprising moving the exiting vehicle along the exiting route after starting movement of the retreating vehicle.

13. A vehicle control system configured to control vehicles adapted to automated valet parking in a parking lot, the vehicle control system comprising:
one or more storage devices configured to store map information of the parking lot and vehicle information indicating positions of the vehicles in the parking lot; and
one or more processors configured to
determine whether a retreating vehicle is present based on the map information and the vehicle information, the retreating vehicle being a vehicle that needs to move from a parking slot where the retreating vehicle is parked to move an exiting vehicle scheduled to exit the parking lot,
determine a retreating route through a retreating route determination process, the retreating route being a traveling route of the retreating vehicle when the retreating vehicle is moved to move the exiting vehicle, the retreating route determination process including
acquiring traveling route information indicating an exiting route that is a traveling route of the exiting vehicle,
searching for a non-interfering route that does not interfere with the exiting route based on the map information, the vehicle information, and the traveling route information, and
determining the non-interfering route as the retreating route, and
move the retreating vehicle along the retreating route.

14. An information processing device configured to control vehicles adapted to automated valet parking in a parking lot, the information processing device comprising:

one or more storage devices configured to store map information of the parking lot and vehicle information indicating positions of the vehicles in the parking lot; and one or more processors configured to determine whether a retreating vehicle is present based on the map information and the vehicle information, the retreating vehicle being a vehicle that needs to move from a parking slot where the retreating vehicle is parked to move an exiting vehicle scheduled to exit the parking lot, determine a retreating route through a retreating route determination process, the retreating route being a traveling route of the retreating vehicle when the retreating vehicle is moved to move the exiting vehicle, the retreating route determination process including acquiring traveling route information indicating an exiting route that is a traveling route of the exiting vehicle, searching for a non-interfering route that does not interfere with the exiting route based on the map information, the vehicle information, and the traveling route information, and determining the non-interfering route as the retreating route, and move the retreating vehicle along the retreating route.

* * * * *